(12) United States Patent
Lawrence

(10) Patent No.: US 6,947,913 B1
(45) Date of Patent: *Sep. 20, 2005

(54) SYSTEMS AND METHODS FOR GENERATING STRING CORRELITHM OBJECTS

(75) Inventor: P. Nick Lawrence, Roanoke, TX (US)

(73) Assignee: Lawrence Technologies, LLC, Dallas, TX (US)

(*) Notice: Subject to any disclaimer, the term of this patent is extended or adjusted under 35 U.S.C. 154(b) by 692 days.

This patent is subject to a terminal disclaimer.

(21) Appl. No.: 09/938,948

(22) Filed: Aug. 23, 2001

(51) Int. Cl.[7] .............................................. G06F 15/18
(52) U.S. Cl. ............................. 706/14; 706/12; 706/46
(58) Field of Search .............................. 706/14, 12, 46

(56) References Cited

U.S. PATENT DOCUMENTS

| | | | |
|---|---|---|---|
| 4,625,242 A | 11/1986 | Baumberg | 358/209 |
| 4,811,199 A | 3/1989 | Kuechler et al. | 364/200 |
| 4,945,421 A | 7/1990 | Baumberg | 358/217 |
| 4,972,363 A | 11/1990 | Nguyen et al. | 364/807 |
| 5,093,900 A | 3/1992 | Graf | 395/24 |
| 5,175,817 A | 12/1992 | Adams et al. | 395/200 |
| 5,208,900 A | 5/1993 | Gardner | 395/27 |
| 5,237,678 A | 8/1993 | Kuechler et al. | 395/600 |
| 5,268,834 A | 12/1993 | Sanner et al. | 364/151 |
| 5,371,834 A | 12/1994 | Tawel | 395/23 |
| 5,386,558 A | 1/1995 | Maudlin et al. | 395/600 |
| 5,438,646 A | 8/1995 | Davidian | 706/41 |
| 5,446,681 A | 8/1995 | Gethner et al. | 702/27 |
| 5,680,475 A | 10/1997 | Zwierski et al. | 382/156 |
| 5,822,741 A | 10/1998 | Fischthal | 706/16 |
| 5,918,232 A | 6/1999 | Pouschine et al. | 707/103 |
| 6,026,397 A | 2/2000 | Sheppard | 707/5 |
| 6,167,391 A | * 12/2000 | Lawrence | 706/26 |

FOREIGN PATENT DOCUMENTS

| | | | |
|---|---|---|---|
| EP | 0 378 115 A2 | 7/1990 | G06F/15/80 |
| GB | 2 206 428 A | 1/1989 | G06F/15/31 |
| WO | WO 93/14459 | 7/1993 | G06F/15/16 |

OTHER PUBLICATIONS

Shi Zhong, A Unified Framework for Model–based Clustering, 2003, Journal of Machine Learning Research 4, 1001–1037.*

P. Nicholas Lawrence, Physical Limits, and Information as a Form of Matter, IEEE, 0–8186–3420–0/93, 83–85.*

"XP–002111789" paper from internet at www.lt.com, Lawrence Technologies, 1996 (2 pages).

"XP–002111790" paper from internet at www.lt.com, Lawrence Technologies, 1996 (3 pages).

International Search Report for International Application No. PCT/US99/06028, Mailed Aug. 24, 1999.

"The Corob Model: A New Computational Paradigm," Lawrence Technologies. (21 pages), Jun. 10, 1998.

"Corobs and Neurophysiology: A White Paper," Lawrence Technologies. (15 pages), May 26, 1998.

* cited by examiner

Primary Examiner—Joseph P. Hirl
(74) Attorney, Agent, or Firm—Baker Botts L.L.P.

(57) ABSTRACT

In one aspect of the invention, a system for processing data includes a memory operable to store a plurality of correlithm objects. Each correlithm object includes a plurality of values defining a point in a particular space. The particular space is defined by a plurality of dimensions and includes a plurality of points. The system also includes a processor operable to generate the values in at least a portion of the correlithm objects. A distance between a first point associated with one of the correlithm objects and each of the plurality of points in the particular space defines a distribution having a mean and a standard deviation such that a ratio of the mean to the standard deviation increases with the number of dimensions of the particular space. A distance between the first point and a second point associated with another of the correlithm objects is substantially larger than the mean of the distribution.

22 Claims, 19 Drawing Sheets

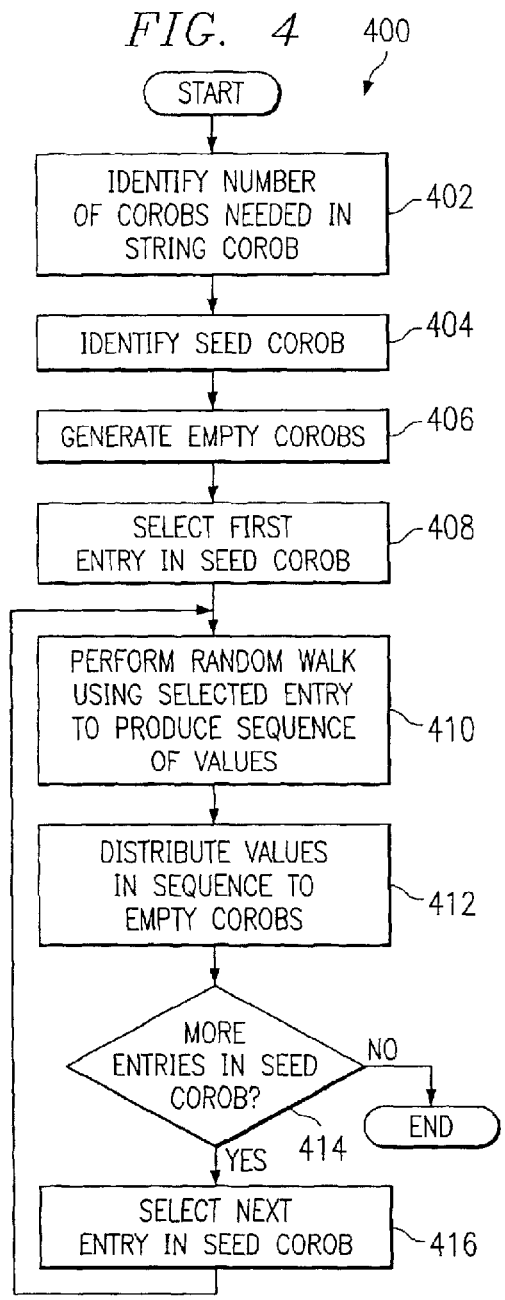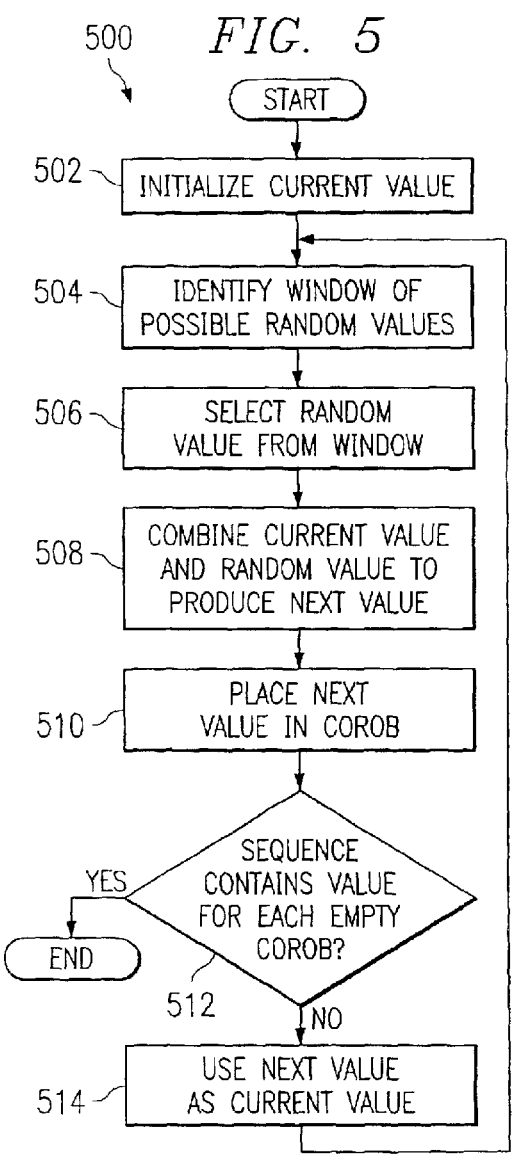

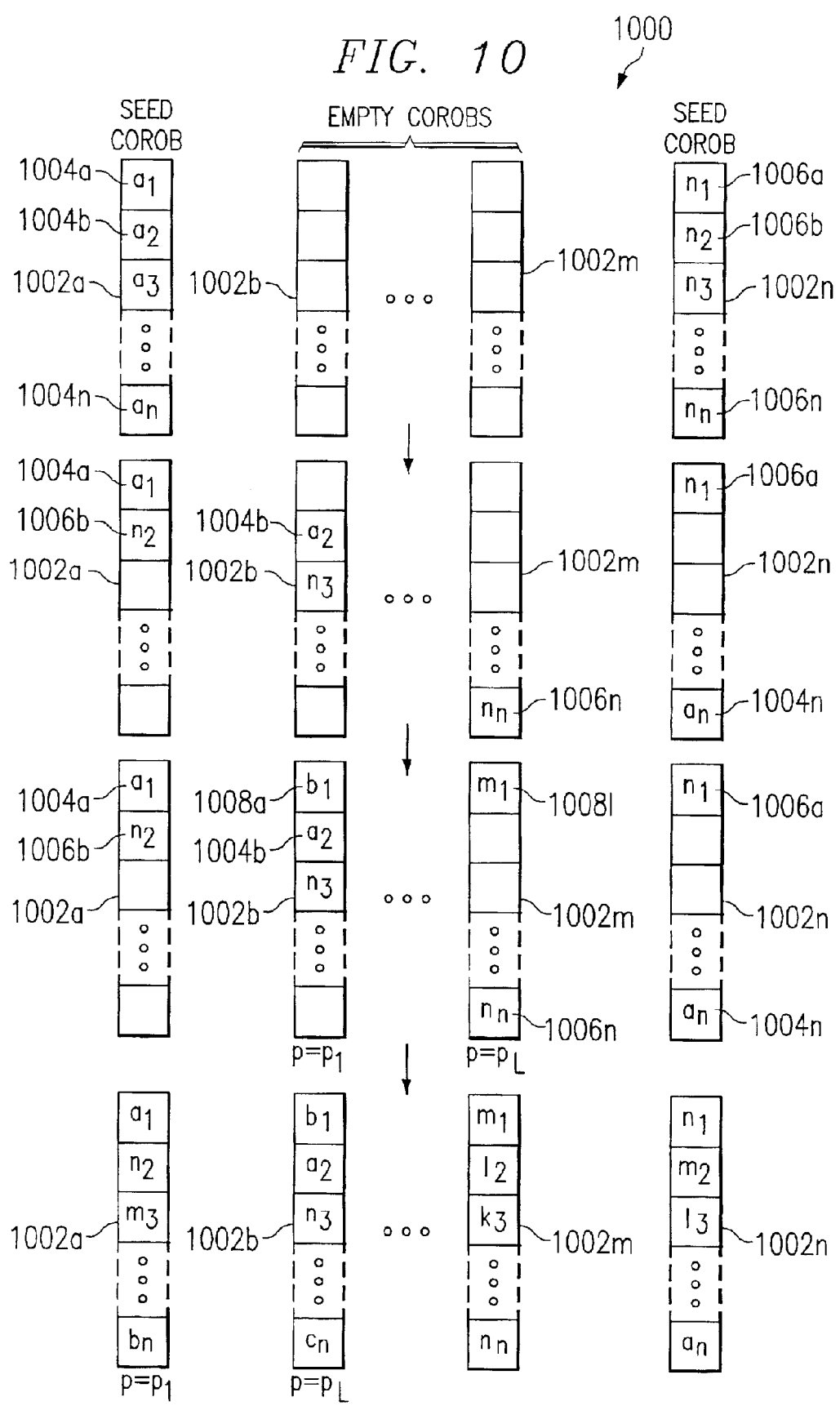

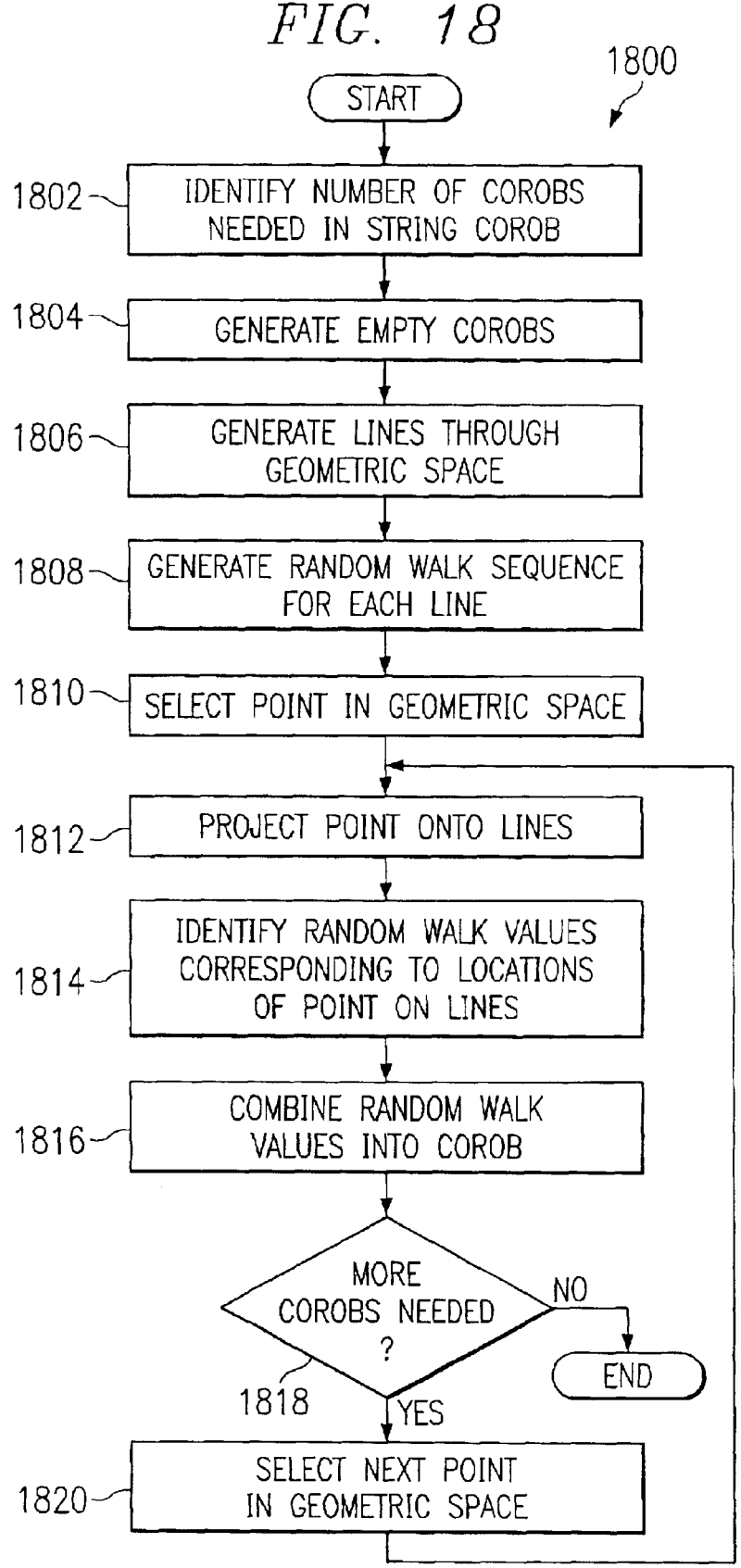

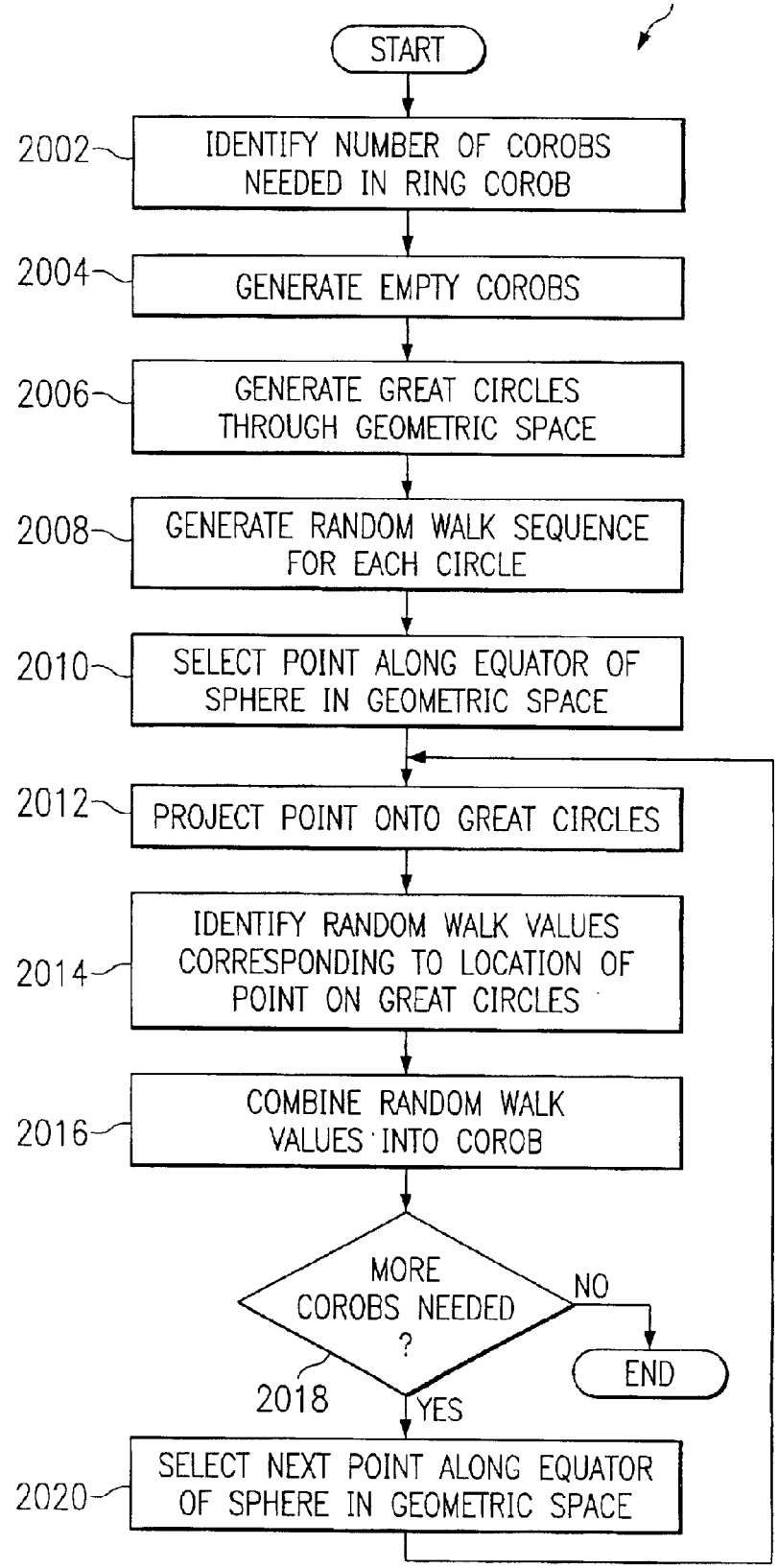

SYSTEMS AND METHODS FOR GENERATING STRING CORRELITHM OBJECTS

TECHNICAL FIELD OF THE INVENTION

This invention relates generally to the field of computing systems, and more particularly to systems and methods for generating string correlithm objects ("corobs").

BACKGROUND OF THE INVENTION

Neurons represent the typical building block in living information processing systems, such as humans. In one model of a neuron, the neuron typically receives input pulses from one or more input neurons, and the neuron then generates output pulses based on the input pulses. The rate of the output pulses of a neuron represents the "state" of the neuron, and the state of the neuron varies depending on the input. As a result, as the inputs to the neuron change, the rate of output pulses also changes.

Computer systems have often been used in attempts to imitate the decision-making processes and behaviors of living information processing systems. Traditional computer systems often have difficulty imitating the behavior of living information processing systems because the computer systems and living information processing systems use different mechanisms in processing information. Living information processing systems typically excel at solving problems that are similar to previously-encountered problems. In contrast, traditional computer systems typically excel in performing exact sequences of steps on exact data or in performing predefined tasks in specific, limited circumstances. This often renders these computer systems unsuitable for imitating the complex and variable behavior of living information processing systems.

SUMMARY OF THE INVENTION

According to the present invention, problems and disadvantages associated with previous computer systems have been substantially reduced or eliminated.

In one aspect of the invention, a system for processing data includes a memory operable to store a plurality of correlithm objects. Each correlithm object includes a plurality of values defining a point in a particular space. The particular space is defined by a plurality of dimensions and includes a plurality of points. The system also includes a processor operable to generate the values in at least a portion of the correlithm objects. A distance between a first point associated with one of the correlithm objects and each of the plurality of points in the particular space defines a distribution having a mean and a standard deviation such that a ratio of the mean to the standard deviation increases with the number of dimensions of the particular space. A distance between the first point and a second point associated with another of the correlithm objects is substantially larger than the mean of the distribution.

Numerous technical advantages are provided according to various embodiments of the present invention. Particular embodiments of the invention may exhibit none, some, or all of the following advantages depending on the implementation. For example, in one embodiment, a system for generating string correlithm objects ("corobs") is provided. The system uses corobs associated with data, and the corobs allow the system to imitate the behavior of living information processing systems. In general, a corob represents a point in zero or more dimensions in space. In one embodiment, each dimension corresponds to an input neuron in a group of neurons. The location of the point in one of the dimensions defines the state of the neuron associated with that dimension. As one or more neurons in the group change states, the location of the point in the multi-dimensional space also changes. As an example, if a neuron receives input pulses from n input neurons, the states of the input neurons could be represented by a point in n-dimensional space. The system uses a corob to represent the current location of the point in n-dimensional space, which also represents the current input values to the neuron. The system may then generate an output based on that corob. As the inputs to the neuron change, the location of the point in n-dimensional space changes, and the system may generate appropriate outputs based on the changing inputs. The use of corobs allows the system to imitate the behavior of groups of neurons, allowing the system to imitate the behavior of living information processing systems more effectively.

Another advantage of at least some embodiments of the invention is that the system may more efficiently produce string corobs. Because corobs represent points in zero or more dimensions in space, the system may compute a distance between the points represented by two corobs. In a particular embodiment, a corob representing a random point in space has an expected or "standard" distance from other corobs representing random points in space. A string corob represents a sequence of corobs in which adjacent corobs in the sequence are closer together or farther apart than the standard distance. The use of string corobs helps the system to imitate the behavior of living information processing systems more effectively. For example, corobs that are closer together or farther apart than expected may indicate that relationships exist between those corobs and the data that those corobs represent. As a particular example, letters of the alphabet may be represented by a string corob, and letters that appear closer together in the string corob may be closer together in the alphabet. Because living information processing systems typically excel at solving problems that are similar to previous problems, the ability to represent relationships between corobs and the data that those corobs represent helps the system to imitate the behavior of living information processing systems.

The ability to generate string corobs may provide additional advantages. For example, corobs may represent points in a multi-dimensional space having a large number of dimensions, such as hundreds or thousands of dimensions. Because of this, each corob in the string corob may require a large amount of storage space. As a result, it may be difficult to pre-build and store an array of string corobs for later use. To reduce the amount of storage space needed, the system may generate the string corobs as needed. The ability to more efficiently generate string corobs for use in the system helps to reduce the amount of storage space needed in the system.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which:

FIG. 4 is a flow diagram illustrating an exemplary method for generating a string corob using a random walk in accordance with the present invention;

FIG. 5 is a flow diagram illustrating an exemplary method for performing a random walk in accordance with the present invention;

FIG. 10 is a diagram illustrating the generation of a ring corob using an interpolation process in accordance with the present invention;

FIG. 18 is a flow diagram illustrating an exemplary method for generating a string corob using a projection process in accordance with the present invention;

FIG. 20 is a flow diagram illustrating an exemplary method for generating a ring corob using a projection process in accordance with the present invention;

DETAILED DESCRIPTION OF EXAMPLE EMBODIMENTS

Figure 1:
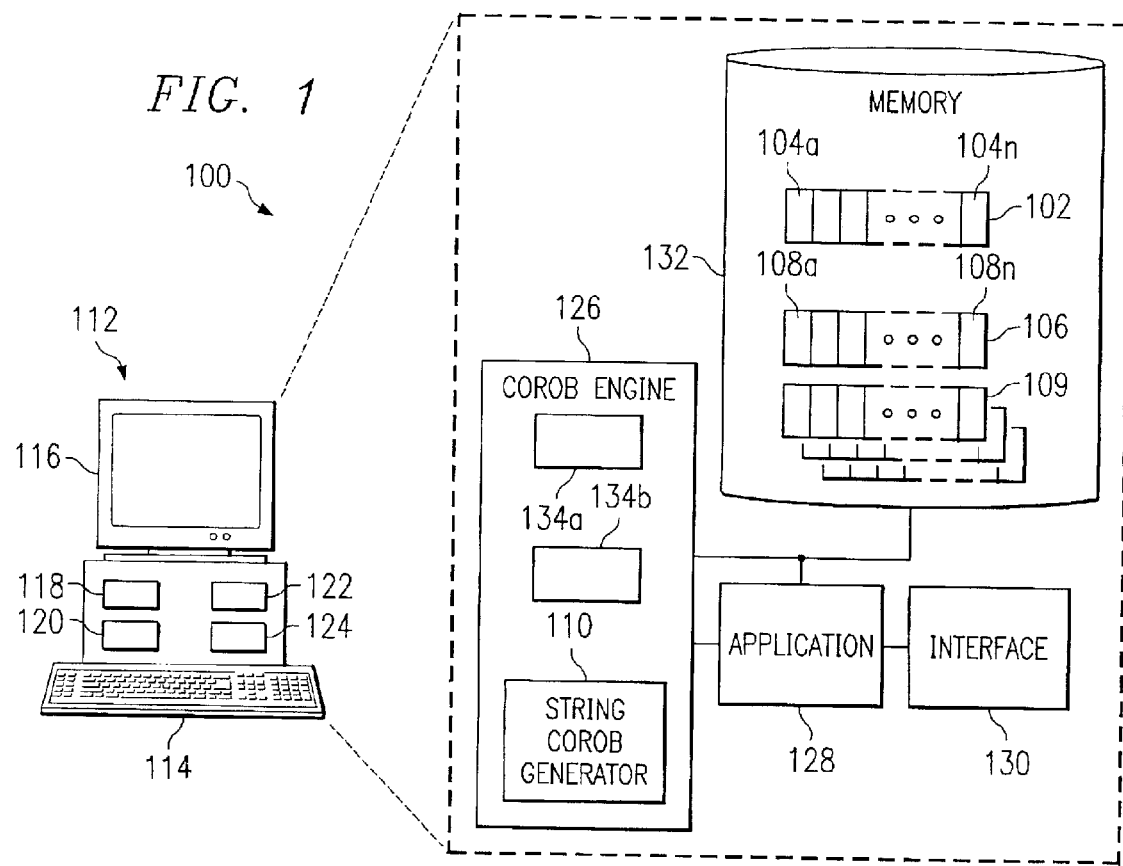
FIG. 1 is a block diagram illustrating an exemplary computer system constructed in accordance with the present invention.

FIG. 1 is a block diagram illustrating an exemplary computer system 100 constructed in accordance with the present invention. In one aspect of operation, system 100 generates and manipulates correlithm objects ("corobs") 102. Corobs 102 may act as data tokens in system 100, and system 100 generates and manipulates corobs 102 to imitate the behaviors and processes of living information processing systems.

In one embodiment, a corob 102 represents a point in space. In this document, the term "space" refers to a geometrical area having zero or more dimensions defined by a set of coordinate axes. If N different dimensions exist in the space, the space may be referred to as "N-space." In this embodiment, corob 102 may include an entry 104 for each dimension in the space. If N different dimensions exist in the space, corob 102 may include N entries 104a–104n, each entry 104 associated with one of the dimensions. The value of a particular entry 104 represents the position or location of the point along the dimension associated with entry 104. When taken together, entries 104a–104n define a particular point in the N-space. Entries 104 in corob 102 may comprise real numbers, imaginary numbers, complex numbers, binary numbers, or any other suitable values. Also, in one embodiment, the values of an entry 104 in corob 102 may be restricted to a range of values, such as between 0.0 and 1.0 inclusive.

In a particular embodiment, a corob 102 represents a point in a generalized sub-space of a particular N-space. The term "sub-space" refers to any set of M dimensions of the N-space, where $0 \leq M \leq N$. A sub-space may include all, some, or none of the dimensions of the N-space. A "generalized sub-space" refers to a sub-space in which the participation of each dimension from the N-space has been defined. The term "participation" refers to the degree to which a dimension is contained within the sub-space. A dimension could be completely contained within a sub-space, fractionally contained within the sub-space, or completely outside the sub-space. A "significance value" represents the degree of participation of a dimension in a sub-space. For example, a dimension completely contained within a sub-space could have a significance value of 1.0, a dimension completely outside the sub-space could have a significance value of 0.0, and dimensions fractionally contained within the sub-space could have significance values between 0.0 and 1.0. A significance vector 106 contains an entry 108 for each dimension in the N-space, and entry 108 represents the significance value for the dimension associated with entry 108. Because significance vector 106 identifies the participation of each dimension from the N-space in the sub-space, significance vector 106 helps to define a "generalized sub-space" of the N-space.

In general, corobs 102 representing random points in space have an expected or "standard" distance from one another. In this document, the term "random corob" refers to a corob 102 that represents a random point in space. Also, the term "distance" refers to any consistent mechanism or mathematical basis for measuring distance between two corobs. For example, the Cartesian distance from a first random corob 102 to a second random corob 102 may be determined using the formula:

$$Distance = \sqrt{\sum_{i=1}^{N} ((A_i - B_i)^2 * AS_1)}$$

where $A_i$ represents entry 104$i$ of first corob 102, $B_i$ represents entry 104$i$ of second corob 102, $AS_i$ represents entry 108$i$ of the significance vector 106 associated with first corob 102, and N represents the number of entries 104 in corobs 102. In another embodiment, system 100 may use the cross-correlation coefficient between two corobs 102 as a measure of distance between the corobs 102.

In one embodiment, the standard distance between random corobs 102 increases monotonically as the number of dimensions increases, and the standard deviation of the distance is approximately constant. In a particular embodiment, the standard distance between random corobs 102 may be approximately determined using the formula:

$$Standard\ Distance = \sqrt{\frac{N}{6}}$$

where N represents the number of entries 104 in corobs 102, which also represents the number of dimensions in space. In this embodiment, the standard deviation is approximately:

$$Standard\ Deviation = \sqrt{\frac{7}{120}}$$

or 0.24.

A string corob 109 represents a sequence of two or more corobs 102 in which adjacent corobs 102 in the sequence are closer together or farther apart than the standard distance. In a particular embodiment, a string corob 109 represents a sequence of two or more corobs 102 in which adjacent corobs 102 in the sequence are significantly closer together or farther apart than the standard distance. The significance of the distance between adjacent corobs 102 may be determined with reference to the standard deviation. For example, system 100 may treat distances within one standard deviation of standard distance as insignificant, and system 100 may treat distances falling outside of one standard deviation of standard distance as significant. System 100 may treat other distances as significant or insignificant depending on the application.

In one aspect of operation, system 100 includes a string corob generator 110. String corob generator 110 is operable to generate a sequence of corobs 102 to produce a string corob 109. System 100 may use string corobs 109 to imitate the behavior of living information processing systems more effectively. Also, because corobs 102 may represent points in a space having numerous dimensions, string corob generator 110 helps to reduce the amount of storage space needed by system 100. For example, system 100 may more effectively generate string corobs 109 when needed, rather than storing large numbers of string corobs 109 for later use. In addition, string corob generator 10 may more efficiently generate string corobs 109 for different applications or for different components of an application, even when the string corobs 109 have different sizes or other characteristics.

In the illustrated embodiment, system 100 includes a host computer 112. Host 112 may execute with any of the well-known MS-DOS, PC-DOS, OS-2, MAC-OS, WINDOWS, UNIX, LINUX, or other appropriate operating systems. Host 112 may, for example, comprise a desktop computer, a laptop computer, a server computer, or any other suitable computing or communicating device. Host 112 may include an input device 114, an output device 116, random access memory (RAM) 118, read-only memory (ROM) 120, CD-ROM, hard drive, or other magnetic or optical storage media 122 or other appropriate volatile or nonvolatile storage and retrieval devices, and one or more processors 124 having a system clock or other suitable timing device or software. Input device 114 may, for example, comprise a keyboard, mouse, graphics tablet, touch screen, pressure-sensitive pad, joystick, light pen, microphone, or other suitable input device. Output device 116 may, for example, comprise a video display, a printer, a disk drive, a plotter, a speaker, or other suitable output device.

Items within the dashed lines in FIG. 1 represent exemplary functional operation and data organization of the associated components of system 100. In the illustrated embodiment, host 112 includes a corob engine 126, an application 128, an interface 130, and a memory 132. Other embodiments of host 112 may be used without departing from the scope of the present invention.

Corob engine 126 supports the use of corobs 102 in host 112. For example, corob engine 126 may generate corobs 102 and/or significance vectors 106 for use by system 100. Corob engine 126 may also manipulate corobs 102 and/or significance vectors 106 to provide the desired functionality in system 100. In one embodiment, corob engine 126 supports one or more algorithms 134 for creating, processing, and manipulating corobs 102. Corob engine 126 may also include string corob generator 110 for generating string corobs 109 for use in system 100. Corob engine 126 may comprise any hardware, software, firmware, or combination thereof operable to support the use of corobs 102 in system 100. Applications 134 and string corob generator 110 may, for example, comprise software applications executing on processor 124 of host 112.

Application 128 represents one or more applications executed by host 112 that use corobs 102 to perform functions in system 100. Application 128 may perform any suitable function in system 100. Application 128 may, for example, perform optical character recognition functions, document reader services, pattern recognition, voice recognition, and robotics operation and control functions. Application 128 may comprise any hardware, software, firmware, or combination thereof operable to use corobs 102 to perform a function in system 100. Application 128 may, for example, comprise a set of instructions, procedures, functions, objects, classes, and/or instances, and related data adapted for implementation in a suitable computer language such as C, C++, Java, or any other appropriate language.

Interface 130 provides an interface to application 128. Interface 130 may, for example, facilitate communication between application 128 and a user of host 112 by receiving information from and communicating information to application 128. Interface 130 may comprise any hardware, software, firmware, or combination thereof operable to facilitate communication with application 128.

Memory 132 stores information used by corob engine 126, application 128, interface 130, and/or other components of host 112. Memory 132 may, for example, store corobs 102, significance vectors 106, and/or string corobs 109 used by corob engine 126 and application 128 in performing different functions in system 100. Memory 132 may comprise any hardware, software, firmware, or combination thereof operable to store and/or facilitate retrieval of information. Memory 132 may store information using any of a variety of data structures, arrangements, or compilations. Memory 132 may, for example, comprise a dynamic random access memory (DRAM), a static random access memory (SRAM), or any other suitable volatile or nonvolatile storage and retrieval device or combination of devices. Although FIG. 1 illustrates memory 132 as residing within host 112, memory 132 may reside at any location that is accessible by host 112.

In one aspect of operation, string corob generator 110 may generate one or more string corobs 109 for use by corob engine 126, application 128, interface 130, or other components of host 112. In one embodiment, a string corob 109 comprises a list of two or more corobs 102 in which the distance between adjacent corobs 102 is greater than or less than the standard distance between random corobs 102. In a particular embodiment, a string corob 109 comprises a list of two or more corobs 102 in which the distance between adjacent corobs 102 significantly departs from the standard distance, such as distances which are more than one standard deviation from the standard distance. String corob generator 110 may use any suitable method for generating string corobs 109. Methods for generating a string corob 109 are illustrated in FIGS. 3 through 23, which are described below.

Although FIG. 1 illustrates one embodiment of system 100, various changes may be made to system 100 without departing from the scope of the present invention. For example, system 100 may include any number of applications 128, interfaces 130, and applications 134. Also, although FIG. 1 illustrates host 112 as a desktop computer, other computing or communicating devices could be used. Further, although string corob generator 110 is illustrated as residing within corob engine 126, string corob generator 110 and corob engine 126 could comprise separate elements in system 100. In addition, string corob generator 110 may be used in any suitable system and is not limited to use in system 100 of FIG. 1. Other changes may be made without departing from the scope of the present invention.

Figure 2A:
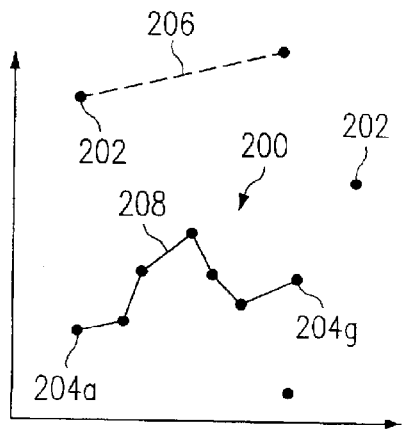
FIGS. 2A through 2D are diagrams illustrating exemplary string corobs constructed in accordance with the present invention.
Figure 2B:
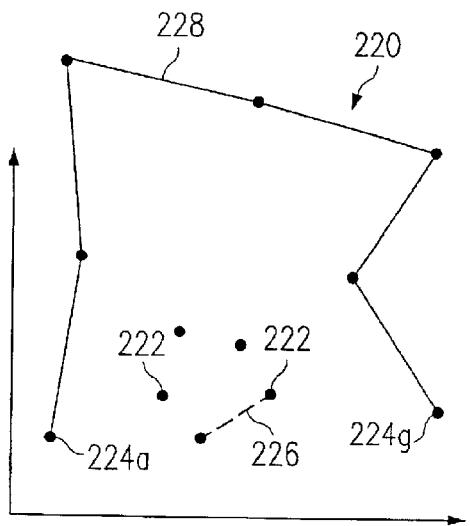
Figure 2C:
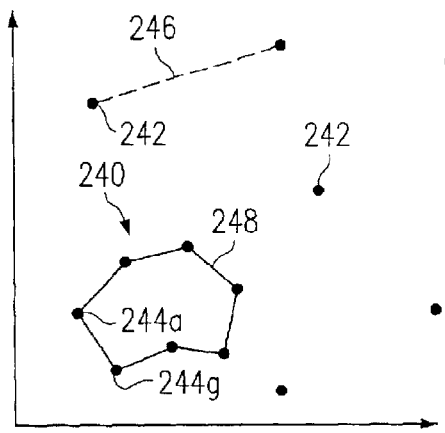
Figure 2D:
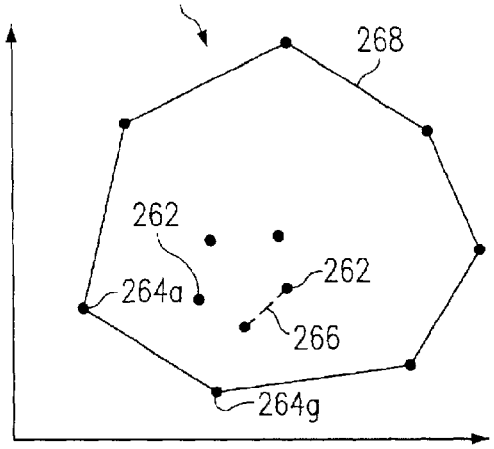

FIGS. 2A through 2D are diagrams illustrating exemplary string corobs constructed in accordance with the present invention. In particular, FIGS. 2A and 2B illustrate string corobs, and FIGS. 2C and 2D illustrate ring corobs, a specific type of string corob. The string corobs in FIGS. 2A through 2D may, for example, be useful in system 100 of FIG. 1. The string corobs illustrated in FIGS. 2A through 2D are for illustration only. Any other suitable string corobs may be used without departing from the scope of the present invention.

In general, two distinct types of spaces are involved in the discussion of the string corobs illustrated in FIGS. 2A through 2D. One type of space may be referred to as "corob space" and the other type of space as "geometric space." As described above, a corob 102 may represent a point in a space having zero or more dimensions. For example, a corob 102 may contain one thousand entries 104 and represent a single point in a space having one thousand dimensions. The space in which the point represented by corob 102 exists may be referred to as the "corob space." In the previous example, the space composed of one thousand dimensions would be the corob space for corob 102. In addition, the corobs 102 that form a string corob 109 may be associated with one another and mapped or projected into a "geometric space." For example, each corob 102 in a string corob 109 could be represented as a point along a one-dimensional line or as a point in a two-dimensional grid. The dimensions in the geometric space may be unrelated to the dimensions in the corob space. The geometric space is used to represent adjacency between corobs 102 in corob space. Corobs 102 that are closer together in geometric space may also be closer together in corob. space. Similarly, corobs 102 that are farther apart in geometric space may also be farther apart in corob space. FIGS. 2A through 2D therefore represent two-dimensional geometric spaces used to illustrate the adjacency of corobs in a string corob, while each corob contained in FIGS. 2A through 2D represents a point in corob space.

FIG. 2A illustrates a string corob 200 and random corobs 202. As explained above, in one embodiment, the standard distance between random corobs 202 increases monotonically as the number of dimensions increases, and the standard deviation of the distance is approximately constant. In a particular embodiment, the standard distance between random corobs 202 is approximately sqrt(N/6), with a standard deviation of approximately 0.24. The standard distance between random corobs 202 in corob space is reflected in the geometric space illustrated in FIG. 2A by a distance 206.

In the illustrated embodiment, string corob 200 includes seven corobs 204a–204g. Adjacent corobs 204 are separated in geometric space by a distance 208. In the geometric space illustrated in FIG. 2A, distance 208 between corobs 204 is less than the distance 206 between random corobs 202. This closer distance 208 between adjacent corobs 204 in geometric space corresponds to a closer distance between adjacent corobs 204 in corob space. In other words, the distance between adjacent corobs 204 in corob space is less than the standard distance between random corobs 202. As a result, corobs 204 form a string corob 200, where adjacent corobs 204 are closer together than the standard distance between random corobs 202.

FIG. 2B illustrates a string corob 220 and random corobs 222. In the illustrated embodiment, the standard distance between random corobs 222 in corob space is reflected as distance 226 in the geometric space illustrated in FIG. 2B. Similarly, the distance between adjacent corobs 224 in corob space is reflected as distance 228 in the geometric space. As shown in FIG. 2B, distance 228 is greater than distance 226, indicating that the distance between adjacent corobs 224 in corob space is greater than the standard distance between random corobs 222. As a result, corobs 224 form a string corob 220, in which adjacent corobs 224 are farther apart than the standard distance between random corobs 222.

FIG. 2C illustrates a ring corob 240 and random corobs 242. In the illustrated embodiment, ring corob 240 includes seven corobs 244a–244g. Ring corobs are a particular type of string corob in which the string corob has no discernible endpoints. For example, while string corob 200 in FIG. 2A has two distinguishable endpoints 204a and 204g, ring corob 240 has no discernible endpoints.

Adjacent corobs 244 are separated by a distance 248 in geometric space, while random corobs 242 are separated by a distance 246 in geometric space. As shown in FIG. 2C, distance 246 is greater than distance 248, meaning that the distance between adjacent corobs 244 in corob space is less than the standard distance between random corobs 242. Because of this, corobs 244 form a ring corob 240 in which corobs 244 are closer together than the standard distance between random corobs 242.

FIG. 2D illustrates a ring corob 260 and random corobs 262. In the illustrated embodiment, the standard distance between random corobs 262 in corob space is reflected as distance 266 in the geometric space of FIG. 2D. Also, the distance between adjacent corobs 264 in corob space is reflected as distance 268 in the geometric space. Because distance 266 is less then distance 268, adjacent corobs 264 are farther apart in corob space than the standard distance between random corobs 262. As a result, corobs 264 form a ring corob 260.

The string corobs 200, 220, 240, 260 shown in FIGS. 2A through 2D are for illustration only. Any suitable string corob may be used in system 100 and generated by string corob generator 110 without departing from the scope of the present invention. For example, any number of corobs may be contained in each of the string corobs.

Figure 3A:
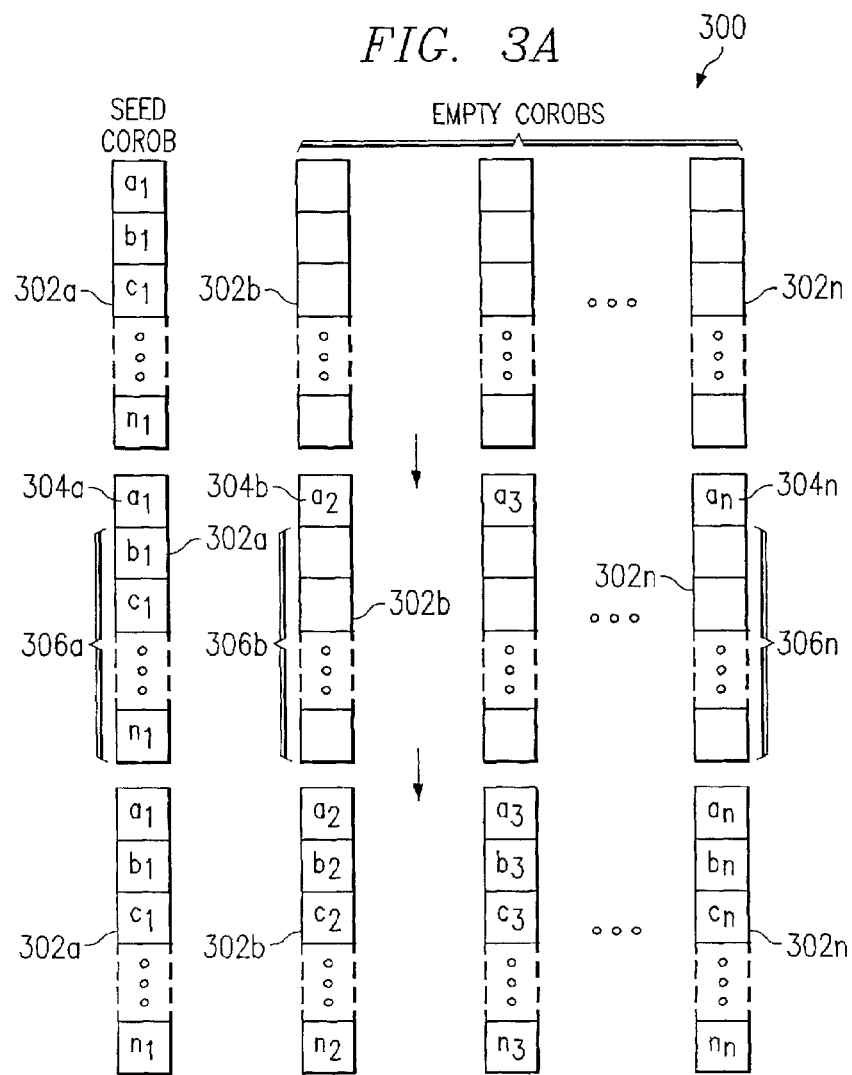
FIGS. 3A and 3B are diagrams illustrating the generation of a string corob using a random walk process in accordance with the present invention.
Figure 3B:
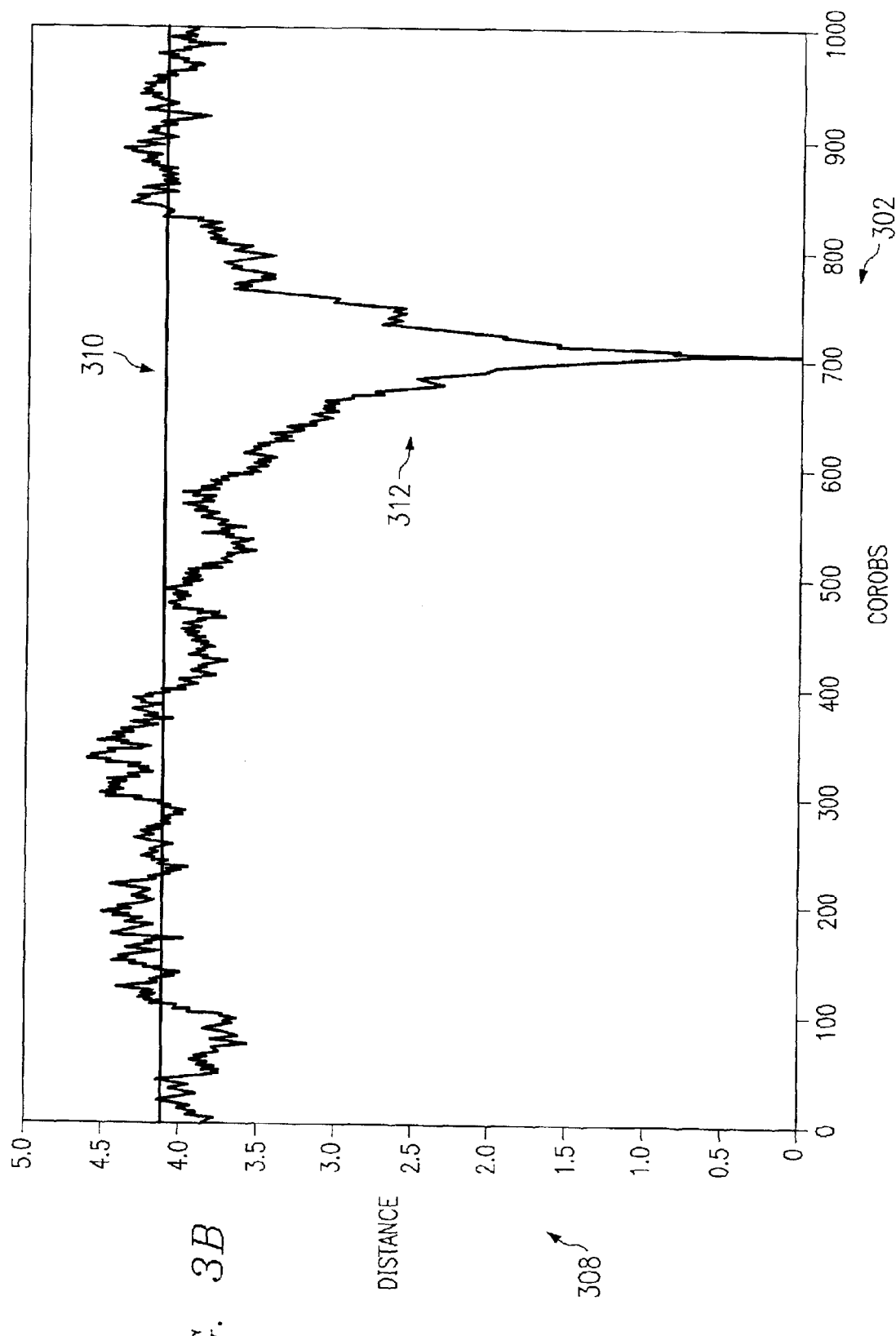

FIGS. 3A and 3B are diagrams illustrating the generation of a string corob 300 using a random walk process in accordance with the present invention. In particular, FIG. 3A is a diagram illustrating the generation of a string corob 300 using the random walk process, and FIG. 3B is a diagram illustrating the distances between corobs 302 in the generated string corob 300.

In FIG. 3A, string corob generator 110 starts with a seed corob 302a. The term "seed corob" refers to a corob from which other corobs in a string corob are produced. The seed corob 302a may be received by string corob generator 110 from an application 128 or other suitable component in system 100, generated by string corob generator 110, or produced in any other suitable manner.

To generate string corob 300, string corob generator 110 produces. one or more empty corobs 302b–302n. Empty corobs 302b–302n represent corobs 302 that string corob generator 110 will create to form string corob 300. To fill the first entry of each empty corob 302b–302n, string corob generator 110 uses values 304a in seed corob 302a to generate a sequence of values 304b–304n using a random walk process. A random walk is a process in which a sequence of values 304b–304n may be produced from a starting value 304a using a specified random process. For example, in one embodiment, values 304b–304n may be determined using the formula:

$$a_i = a_{i-1} + e_i$$

where $a_i$ represents value 304i, $a_{i-1}$ represents value 304(i-1), and $e_i$ represents a random value. One example of a random walk process is illustrated in FIG. 5, which is described below. By randomly selecting the random values $e_i$ used in the random walk formula, string corob generator 110 may produce a series. of values 304b–304n in which adjacent values are close together or widely separated. A similar formula may be used to produce the remaining entries 306b–306n in corobs 302b–302n using the remaining entries 306a of seed corob 302a. Because the values in each sequence produced using a random walk may be close together or widely separated, the corobs 302 generated using a random walk may similarly be close together or widely separated. This produces a string corob 300, in which adjacent corobs 302 are closer together or farther apart than the standard distance between random corobs.

In one embodiment, string corob generator 110 may produce a string corob 300 having one thousand corobs 302. Each corob 302 may be numbered in numerical order from one to one thousand, and each corob 302 may include one hundred entries. FIG. 3B illustrates the distance 308 of each corob 302 from the 702nd corob 302 in string corob 300.

The standard distance 310 in this example would approximately equal sqrt(100/6), or approximately 4.08. As shown in FIG. 3B, the distance between the 702nd corob 302 and itself is zero. The distance between the 702nd corob 302 and corobs 302 that are closer in numerical order to the 702nd corob 302 is less than standard distance 310. The distance between the 702nd corob 302 and corobs 302 that are farther away in numerical order from the 702nd corob 302 is approximately standard distance 310. This forms a divergence well 312 around the 702nd corob 302, where corobs 302 closer in numerical order to a specified corob 302 are closer in distance while corobs 302 farther away in numerical order diverge toward standard distance 310. A similar divergence well 312 may exist around each of the one thousand corobs 302 in string corob 300.

The shape of divergence well 312 may be controlled by string corob generator 110. For example, during a random walk, string corob generator 110 may select a random value from a window or range of random values. The use of smaller windows limits the amount of variation between the entries of two adjacent corobs 302, which means that the distance between those adjacent corobs 302 remains smaller. As a result, the divergence well 312 would typically be wider, with the distance between corobs 302 approaching standard distance 310 more slowly. The use of larger windows increases the amount of variation between the entries of two adjacent corobs 302, so the distance between the adjacent corobs 302 may become larger. The divergence well 312 would therefore typically be narrower, and the distance between corobs 302 approaches standard distance 310 more rapidly.

The corobs 302 illustrated in FIG. 3A and the distances 308 illustrated in FIG. 3B are for illustration only. Other suitable corobs 302 and/or distances 308 may be used without departing from the scope of the present invention. For example, string corob generator 110 may generate a string corob 300 containing any number of corobs 302, and corobs 302 may contain any number of entries 304, 306.

FIG. 4 is a flow diagram illustrating an exemplary method 400 for generating a string corob 300 using a random walk in accordance with the present invention. String corob generator 110 identifies the number of corobs 302 needed in the string corob 300 at step 402. This may include, for example, string corob generator 110 receiving information from an application 128 identifying the number of corobs 302 needed in the string corob 300. In another embodiment, string corob generator 110 may recursively generate corobs 302 without identifying a fixed number of corobs 302 to produce. String corob generator 110 identifies a seed corob 302a at step 404. This may include, for example, string corob generator 110 receiving the seed corob 302a from an application 128, generating seed corob 302a by selecting a random point in corob space, or in any other suitable manner. String corob generator 110 generates one or more empty corobs 302b–302n at step 406.

String corob generator 110 selects the first entry 304a of seed corob 302a at step 408. String corob generator 110 performs a random walk using the selected entry 304a to produce a sequence of values 304b–304n at step 410. One embodiment of a random walk is shown in FIG. 5, which is described below. String corob generator 110 distributes the sequence of values 304b–304n to empty corobs 302b–302n at step 412. This may include, for example, string corob generator 110 storing the sequence of values 304b–304n in corobs 302b–302n, respectively.

String corob generator 110 determines whether there are additional entries 306a in seed corob 302a at step 414. This may include, for example, string corob generator 110 determining whether a random walk has been performed for each entry in seed corob 302a. If additional entries 306a remain, string corob generator 110 selects the next entry 306 at step 416. String corob generator 110 then returns to step 410 to perform a random walk using the new selected entry 306a. Otherwise, if no more entries 306 remain in seed corob 302a at step 414, method 400 ends. String corob generator 110 has produced a series of corobs 302a–302n in which adjacent corobs 302 are closer together or farther apart than the standard distance between random corobs. String corob generator 110 may then communicate the string corob 300 to the application 128 or other component of system 100 that requested the generation of the string corob 300.

Although FIG. 4 illustrates one embodiment of method 400, various changes may be made to method 400 without departing from the scope of the present invention. For example, string corob generator 110 may select and process the last entry of seed corob 302a first. Also, rather than selecting the first entry 304a from seed corob 302a and producing one entry for each empty corob 302b–302n before proceeding to the next entry 306 of seed corob 302a, string corob generator 110 could completely fill one empty corob 302b before proceeding to the next empty corob 302c. In addition, string corob generator 110 need not identify a fixed number of corobs 302 to generate or produce that number of empty corobs 302 before starting to generate the entries in corobs 302. For example, string corob generator 110 could recursively generate corobs 302 until other conditions are met.

FIG. 5 is a flow diagram illustrating an exemplary method 500 for performing a random walk in accordance with the present invention. String corob generator 110 initializes a current value at step 502. This may include, for example, string corob generator 110 initially setting the current value equal to the first entry 304a of seed corob 302a. String corob generator 110 identifies a window of possible random values at step 504. The window represents the possible random values that may be combined with the current value identified at step 502. String corob generator 110 could use a window of any suitable size. Also, the window may be centered on any suitable value, such as on the current value. For example, in one embodiment, each entry in a corob 302 has an allowable value of between 0.0 and 1.0 inclusive, and string corob generator 110 uses a window size of 0.2. In this embodiment, if the current value is equal to 0.45, the window could encompass values between 0.35 and 0.55 inclusive. If the current value is equal to 0.05, string corob generator 110 could modify the size of the window to cover values between 0.0 and 0.15 inclusive, which prevents the window from including values that are outside the range of allowable values.

String corob generator 110 selects a random value from the window of random values at step 506. This may include, for example, string corob generator 110 using a specified process to randomly select one of the values from the window of random values. String corob generator 110 may treat the value selected as positive or negative. String corob generator 110 combines the current value and the selected random value at step 508. This produces the next value 304b in the sequence of values. This may include, for example, string corob generator 110 combining the current value and the random value using a signed addition operation. String corob generator 110 places the next value 304b in the appropriate corob 302b at step 510.

String corob generator 110 determines whether a value has been produced for each empty corob 302b–302n at step 512. If additional values are needed, string corob generator 110 selects the value 304b produced at step 508 as the current value at step 514. String corob generator 110 then returns to step 504 to produce another value 304c in the sequence. This process continues until string corob generator 110 has produced a series of values 304b–304n. At that point, method 500 ends. String corob generator 10 has produced one entry 304 for each empty corob 302b–302n in the string corob 300.

Although FIG. 5 illustrates one embodiment of method 500 for performing a random walk, various changes may be made to method 500 without departing from the scope of the present invention. For example, string corob generator 110 may use any other suitable random walk process to generate a string corob 300.

Figure 6:
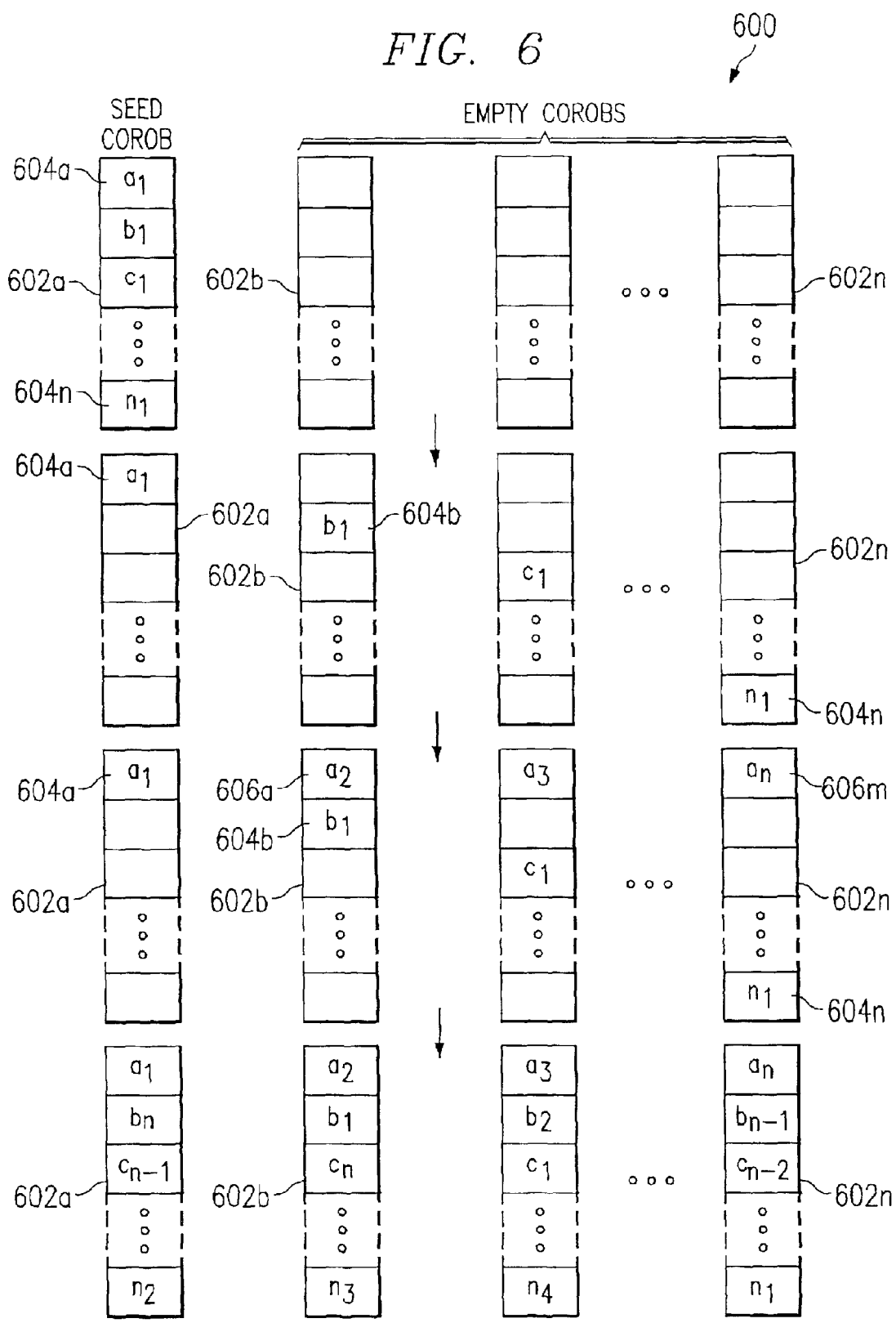
FIG. 6 is a diagram illustrating the generation of a ring corob using a random walk process in accordance with the present invention.

FIG. 6 is a diagram illustrating the generation of a ring corob 600 using a random walk process in accordance with the present invention. String corob generator 110 starts with a seed corob 602a having entries 604a–604n. The seed corob 602a may be received by string corob generator 110 from an application 128, generated by string corob generator 110, or obtained in any other suitable manner.

To generate a ring corob 600, string corob generator 110 produces one or more empty corobs 602b–602n. String corob generator 110 then distributes the entries 604a–604n of seed corob 602a in corobs 602b–602n. For example, string corob 10 may leave the first entry 604a in corob 602a, place the second entry 604b in the second corob 602b, and place the last entry 604n in corob 602n. This is one example distribution of entries 604 in corobs 602. Other distributions may be performed without departing from the scope of the present invention.

String corob generator 110 may then generate a sequence of entries 606a–606m using a random walk process. The random walk process may, for example, be the same or similar to the method described above with respect to FIG. 5. String corob generator 110 may use entry 604a as the starting value of the random walk process to generate entries 606a–606m. This produces a first row of entries in corobs 602–602n. While the term "row" is used to describe the arrangement of entries 606, other arrangements may be used without departing from the scope of the present invention.

String corob generator 110 repeats this process for each entry 604b–604n originally contained in seed corob 602a to produce the remaining entries in corobs 602. For example, string corob generator 110 produces a series of entries for the second value 604b from seed corob 602a, which has been placed in corob 602b. Because the starting entry 604b of this sequence is located in the second corob 602b of the ring corob 600, the series of entries produced by string corob generator 110 is distributed across the other corobs 602c–602n and corob 602a. This shifts the sequence of values in the second row of corobs 602 to the right. Repeating the same process for the remaining entries 604 from seed corob 602 creates a ring corob 600. By using a random walk process, corobs 602 are close together or widely separated, forming a string corob. Because the rows of entries in corobs 602 are shifted to various degrees, the corobs 602 have no discernible endpoints, forming a ring corob 600.

As illustrated in FIG. 6, the values in corobs 602a–602n may be the same values contained in corobs 302a–302n of FIG. 3, except that many of the values have new positions in FIG. 6. For example, the first row of entries in corobs 602 is the same as the first row of entries in corobs 302. The second row in corobs 602 is the same as the second row in corobs 302, but the entries in corobs 602 have been shifted one position to the right. Similarly, the third row in corobs 602 is the same as the third row in corobs 302, but the entries in corobs 602 have been shifted two positions to the right. In another embodiment, string corob generator 110 may produce ring corob 600 by using the method illustrated in FIG. 3, and then shifting the rows of entries as needed. For example, after producing corobs 302, string corob generator 110 could shift the second row of entries one position to the right, shift the third row of entries two positions to the right, and so on. This would eliminate the need for string corob generator 110 to distribute entries 604b–604n in corobs 602b–602n.

Figure 7:
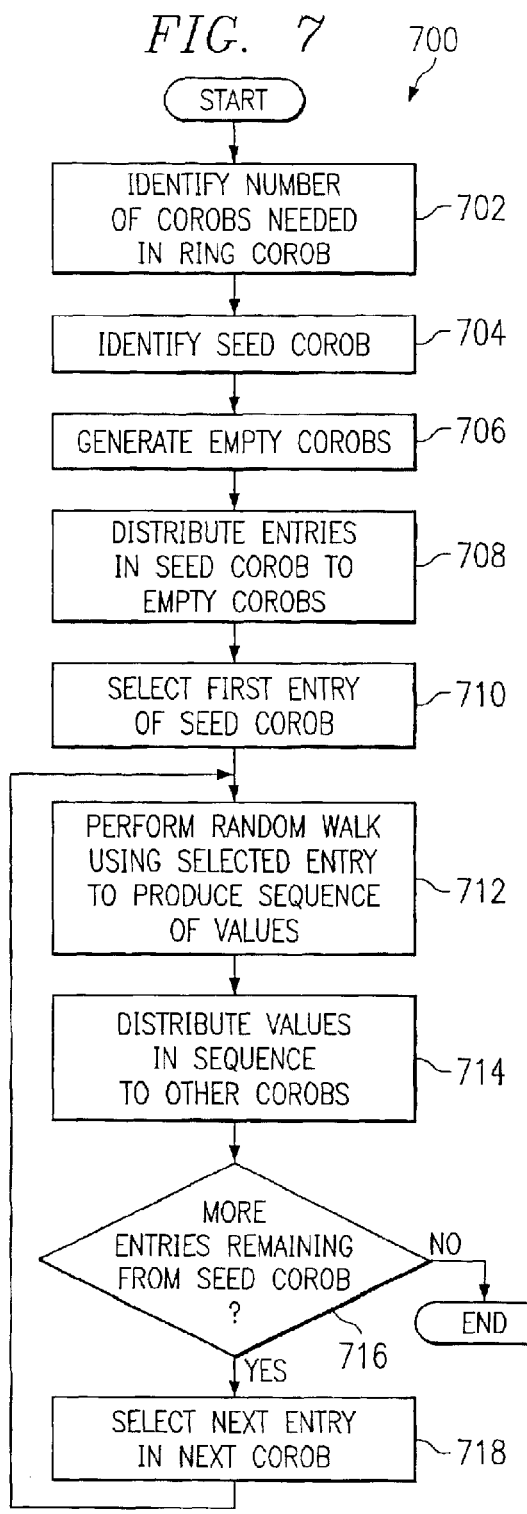
FIG. 7 is a flow diagram illustrating an exemplary method for generating a ring corob using a random walk in accordance with the present invention.

FIG. 7 is a flow diagram illustrating an exemplary method 700 for generating ring corob 600 using a random walk in accordance with the present invention. String corob generator 110 identifies the number of corobs 602 needed in ring corob 600 at step 702. String corob generator 110 identifies a seed corob 602a at step 704, and string corob generator 110 generates one or more empty corobs 602b–602n at step 706.

String corob generator 110 distributes the entries 604b–604n from seed corob 602a to the empty corobs 604b–604n at step 708. This may include, for example, string corob generator 110 placing one entry 604 in each corob 602b–602n. String corob generator 110 selects the first entry 604a from seed corob 602a at step 710. The first entry 604a may, for example, have remained in seed corob 602a during the distribution of entries 604b–604n to corobs 602b–602n.

String corob generator 110 performs a random walk using the selected entry 604a to produce a sequence of entries 606a–606m at step 712. String corob generator 110 could, for example, perform the random walk illustrated in FIG. 5. String corob generator 110 distributes the sequence of entries 606a–606m to corobs 602b–602n at step 714.

String corob generator 110 determines whether there are additional entries 604b–604n from seed corob 602a remaining to be processed at step 716. This may include, for example, string corob generator 110 determining whether a random walk has been performed for each entry 604b–604n. If additional entries 604 remain, string corob generator 110 selects the next entry. 604b in the next corob 602b at step 718. String corob generator 110 then returns to step 712 to perform a random walk using the new selected entry 604b. String corob generator 110 repeats this process for each entry 604b–604n. After processing the last entry 604n originally contained in seed corob 602a, method 700 ends. String corob generator 110 has produced a series of corobs 602a–602n in which adjacent corobs 602 are closer together or farther apart than the standard distance between random corobs. Also, there are no discernible endpoints in the sequence of corobs 602a–602n, so string corob generator 110 has produced a ring corob 600.

Although FIG. 7 illustrates one method 700 for generating a ring corob 600, various changes may be made to method 700 without departing from the scope of the present invention. For example, as described above, string corob generator 110 could produce corobs 302a–302n using method 400 of FIG. 4. String corob generator 110 could then shift the rows of entries in corobs 302 to produce ring corob 600.

Figure 8:
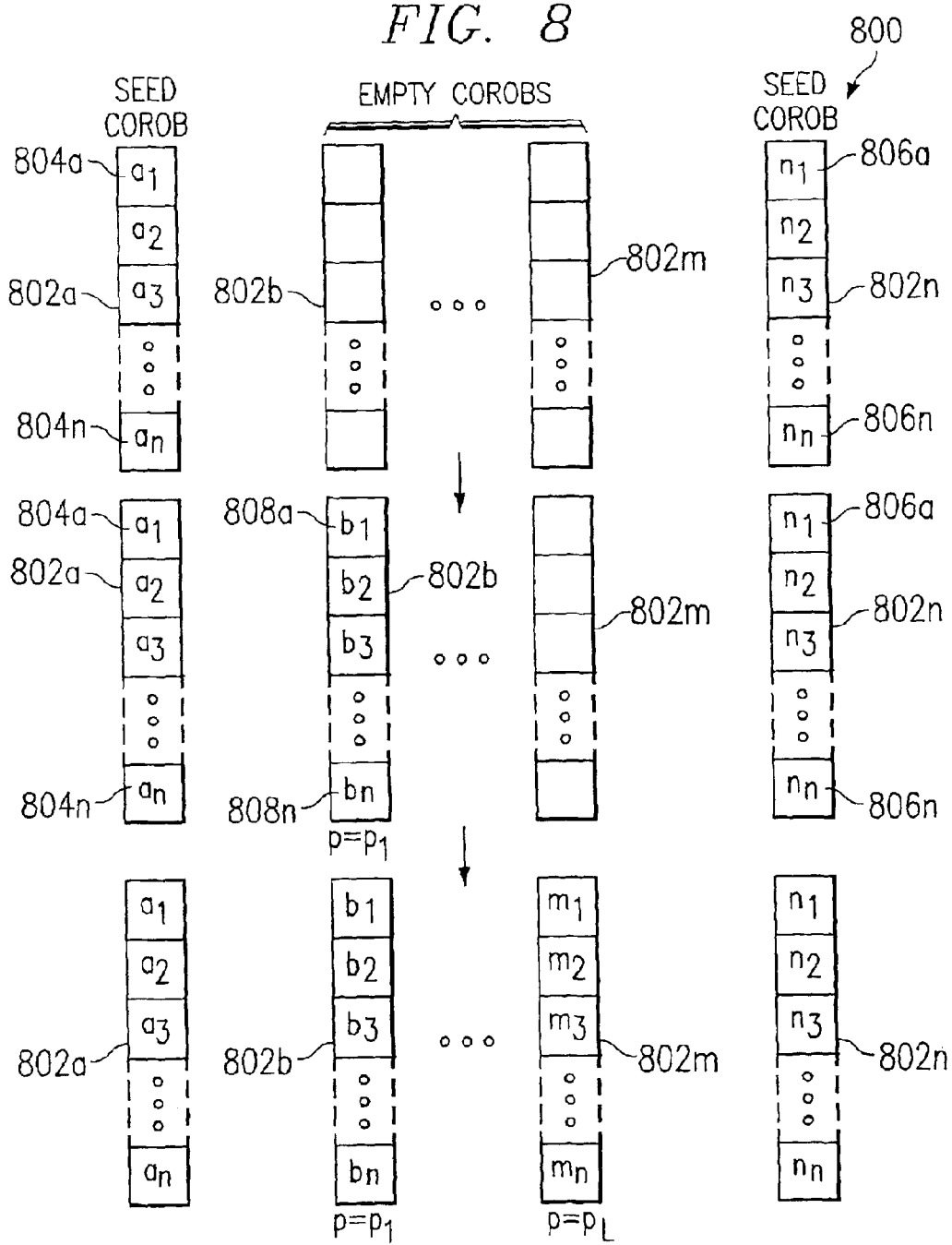
FIG. 8 is a diagram illustrating the generation of a string corob using an interpolation process in accordance with the present invention.

FIG. 8 is a diagram illustrating the generation of a string corob 800 using an interpolation process in accordance with the present invention. String corob generator 110 starts with two seed corobs 802a and 802n. The seed corobs 802a and 802n may be received by string corob generator 110 from an application 128, generated by string corob generator 110, or obtained in any other suitable manner. In the illustrated embodiment, seed corob 802a includes entries 804a–804n, and seed corob 802n includes entries 806a–806n. String corob generator 110 also generates empty corobs 802b–802m.

To generate entries for corobs 802b–802m, string corob generator 110 performs an interpolation process. String corob generator 110 may use any suitable interpolation process to generate entries for corobs 802b–802m. In one embodiment, string corob generator 110 uses a linear interpolation process. In a particular embodiment, string corob generator 110 treats seed corob 802a as residing at a point of 0.0 along a line in geometric space, and seed corob 802n as residing at a point of 1.0 along the line in geometric space. String corob generator 110 then selects a point between 0.0 and 1.0 and generates entries for a corob 802 at that points. For example, string corob generator 110 may generate entries 808a–808n of corob 802b using the formula:

$$b_i = a_i + p_i(n_i - a_i)$$

where $a_i$ represents entry 804i, $b_i$ represents entry 808i, $n_i$ represents entry 806i, and $p_i$ represents the value of a point selected between 0.0 and 1.0. A similar formula may be used to produce the remaining entries for corobs 802c–802m. By using different values $p_i$ between 0.0 and 1.0 for corobs 802b–802m, string corob generator 110 may produce different corobs 802b–802m between seed corobs 802a and 802n. The seed corobs 802a and 802n and the generated corobs 802b–802m form a string corob 800. Adjacent corobs 802 in the string corob 800 are closer together or farther apart than the standard distance between random corobs.

Figure 9:
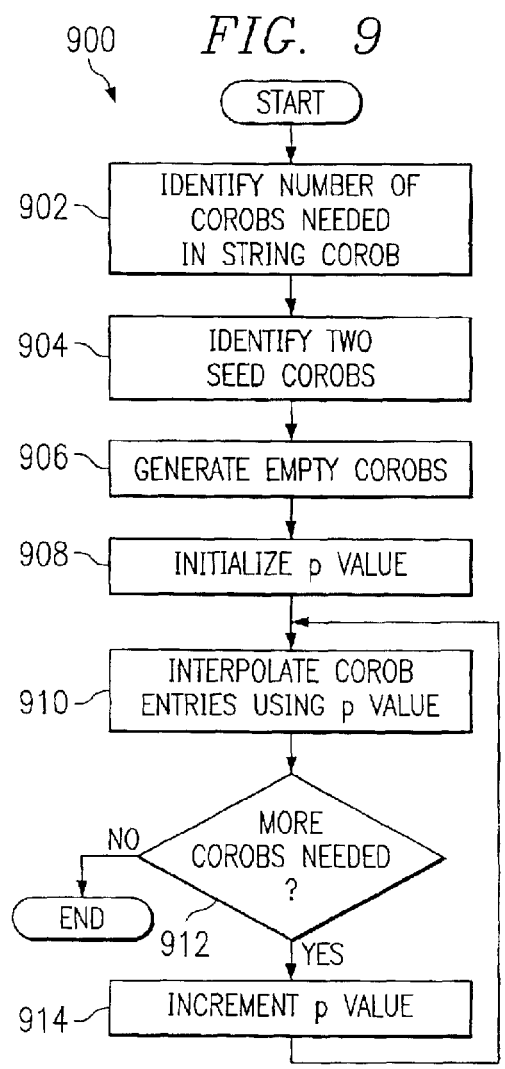
FIG. 9 is a flow diagram illustrating an exemplary method for generating a string corob using an interpolation process in accordance with the present invention.

FIG. 9 is a flow diagram illustrating an exemplary method 900 for generating a string corob 800 using an interpolation process in accordance with the present invention. In particular, method 900 performs a linear interpolation to generate corobs 802 in string corob 800. Other interpolation methods may be used without departing from the scope of the present invention.

String corob generator 110 identifies the number of corobs 802 needed in string corob 800 at step 902. String corob generator 110 identifies two seed corobs 802a and 802n at step 904, and string corob generator 110 generates one or more empty corobs 802b–802m at step 906.

String corob generator 110 selects an initial point $p_i$ between seed corobs 802a and 802n at step 908. In one embodiment, the first seed corob 802a is associated with a value of 0.0 in geometric space, and the second seed corob 802n is associated with a value of 1.0. In this embodiment, string corob generator 110 selects an initial point $p_i$ between 0.0 and 1.0. For example, string corob generator 110 could select a point at 0.05. String corob generator 110 interpolates the entries 808a–808n in a corob 802b using the selected point at step 910. This may include, for example, string corob generator 110 generating entries 808 in corob 802b using entries 804 and 806 in seed corobs 802a and 802n, respectively, and the value selected at step 908.

String corob generator 110 determines whether entries for more corobs 802 need to be generated at step 912. This may include, for example, string corob generator 110 comparing the number of corobs 802 currently containing entries in string corob 800 with the total number of corobs 802 needed in string corob 800. If additional corobs 802 are needed, string corob generator 110 increments the value of the selected point at step 914. This may include, for example, incrementing the point by a value of 0.05. Any suitable increment may be used without departing from the scope of the present invention. In one embodiment, the points used to produce corobs 802b–802m are evenly spaced in geometric space. For example, each point may be separated from other points by a distance of 0.05 in geometric space. String corob generator 110 then returns to step 910 to generate the entries in another corob 802c. String corob generator 110 repeats this process until the entries in corobs 802b–802m are generated, producing a string corob 800.

FIG. 10 is a diagram illustrating the generation of a ring corob 1000 using an interpolation process in accordance with the present invention. String corob generator 110 starts with two seed corobs 1002a and 1002n, which contain entries 1004a–1004n and 1006a–1006n, respectively.

To generate entries for corobs 1002b–1002m, string corob generator 110 distributes entries 1004a–1004n and entries 1006a–1006n of seed corobs 1002a and 1002n, respectively, in corobs 1002a–1002n. For example, string corob 110 may leave the first entry 1004a in corob 1002a, place the second entry 1004b in the second corob 1002b, and place the last entry 1004n in corob 1002n. Similarly, string corob 110 may leave the first entry 1006a in corob 1002n, place the second entry 1006b in the first corob 1002a, and place the last entry 1006n in corob 1002m.

String corob generator 110 then performs an interpolation process to produce entries 1008a–1008l. The interpolation process may, for example, be the same or similar to the method described above in FIGS. 8 and 9. In one embodiment, string corob generator 110 uses a linear interpolation process to generate entries 1008a–1008l, and string corob generator 110 uses points $p_i$ through $p_L$ to produce entries 1008a–1008l. String corob generator 110 uses a similar process to produce the remaining entries in corobs 1002a–1002n, shifting the points $p_i$ through $p_L$ to the right each time string corob generator 110 completes a row of entries in corobs 1002a–1002n. When completed, corobs 1002a–1002n form a ring corob 1000. Adjacent corobs 1002 in ring corob 1000 are closer together or farther apart than the standard distance between random corobs, and no discernible endpoints exist in the ring corob 1000.

As illustrated in FIG. 10, the values in corobs 1002 may be the same values contained in corobs 802 of FIG. 8, except that many of the values have new positions in FIG. 10. For example, the first row of entries in corobs 1002 is the same as the first row of entries in corobs 802. The second row in corobs 1002 is the same as the second row in corobs 802, but the entries in corobs 1002 have been shifted one position to the right. In another embodiment, string corob generator 110 may produce ring corob 1000 by using the method illustrated in FIGS. 8 and 9, and then shifting the rows of entries as needed. This would eliminate the need for string corob generator 110 to distribute entries 1004 and 1006 in corobs 1002.

Figure 11:
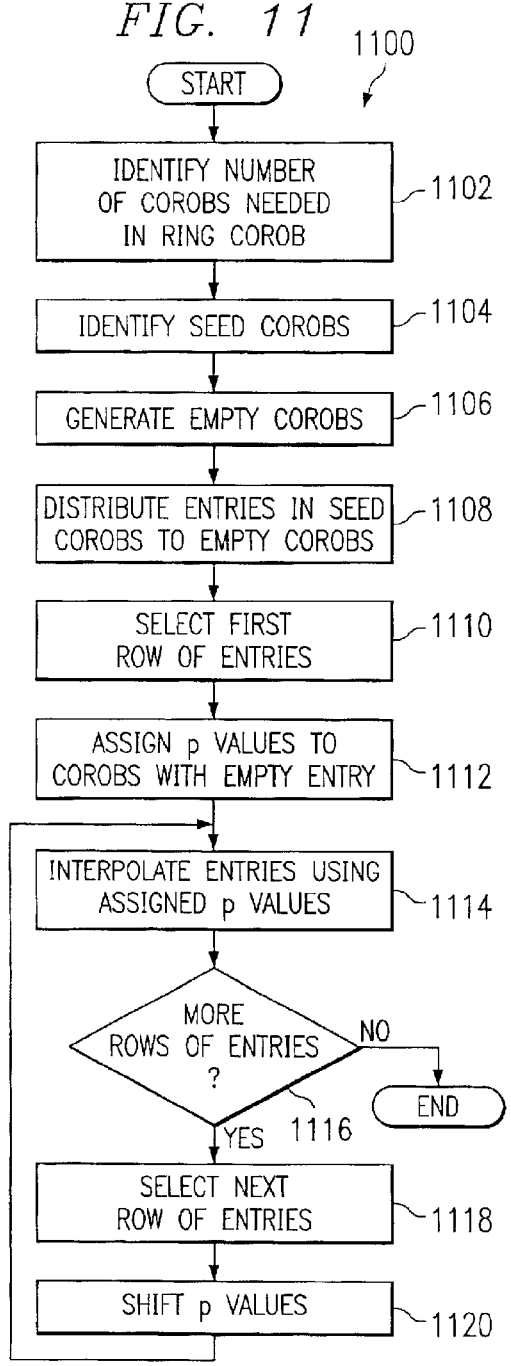
FIG. 11 is a flow diagram illustrating an exemplary method for generating a ring corob using an interpolation process in accordance with the present invention.

FIG. 11 is a flow diagram illustrating an exemplary method 1100 for generating a ring corob 1000 using an interpolation process in accordance with the present invention. In particular, method 1100 performs a linear interpolation to generate corobs 1002 in ring corob 1000. Other interpolation methods may be used without departing from the scope of the present invention.

String corob generator 110 identifies the number of corobs 1002 needed in ring corob 1000 at step 1102. String corob generator 110 identifies two seed corobs 1002a and 1002n at step 1104, and string corob generator 110 generates one or more empty corobs 1002b–1002m at step 1106. String corob generator 110 distributes the entries 1004b–1004n from seed corob 1002a to corobs 1002b–1002n, respectively, and the entries 1006b–1006n from seed corob 1002n to corobs 1002a–1002m, respectively, at step 1108.

String corob generator 110 selects the first row of entries in corobs 1002 at step 1110. String corob generator 110 assigns values between 0.0 and 1.0 to each corob 1002b–1002m having an empty entry in the first row at step 1112. This may include, for example, string corob generator 110. selecting values that are evenly spaced between 0.0 and 1.0. Using the assigned values, string corob generator 110 interpolates values for the first row of entries in corobs 1002 at step 1114.

String corob generator 110 determines if additional rows of entries remain to be processed in corobs 1002 at step 1116. If an additional row remains, string corob generator 110 selects the next row of entries at step 1118. String corob generator 110 also shifts the assigned points $p_i$ through $p_L$ one position to the right at step 1120. String corob generator 110 then returns to step 1114 to generate values for the second row of entries. This process continues until string corob generator 110 has produced a value for each entry in corobs 1002. After processing the last row of entries in corobs 1002, method 1100 ends. String corob generator 110 has produced a series of corobs 1002a–1002n without discernible endpoints and in which adjacent corobs 1002 are closer together or farther apart than the standard distance between random corobs.

Although FIG. 11 illustrates one method 1100 for generating a ring corob 1000, various changes may be made to method 1100 without departing from the scope of the present invention. For example, as described above, string corob generator 110 could produce corobs 802 using method 900 of FIG. 9. String corob generator 110 could then shift the rows of entries in corobs 802 to produce ring corob 1000.

Figure 12:
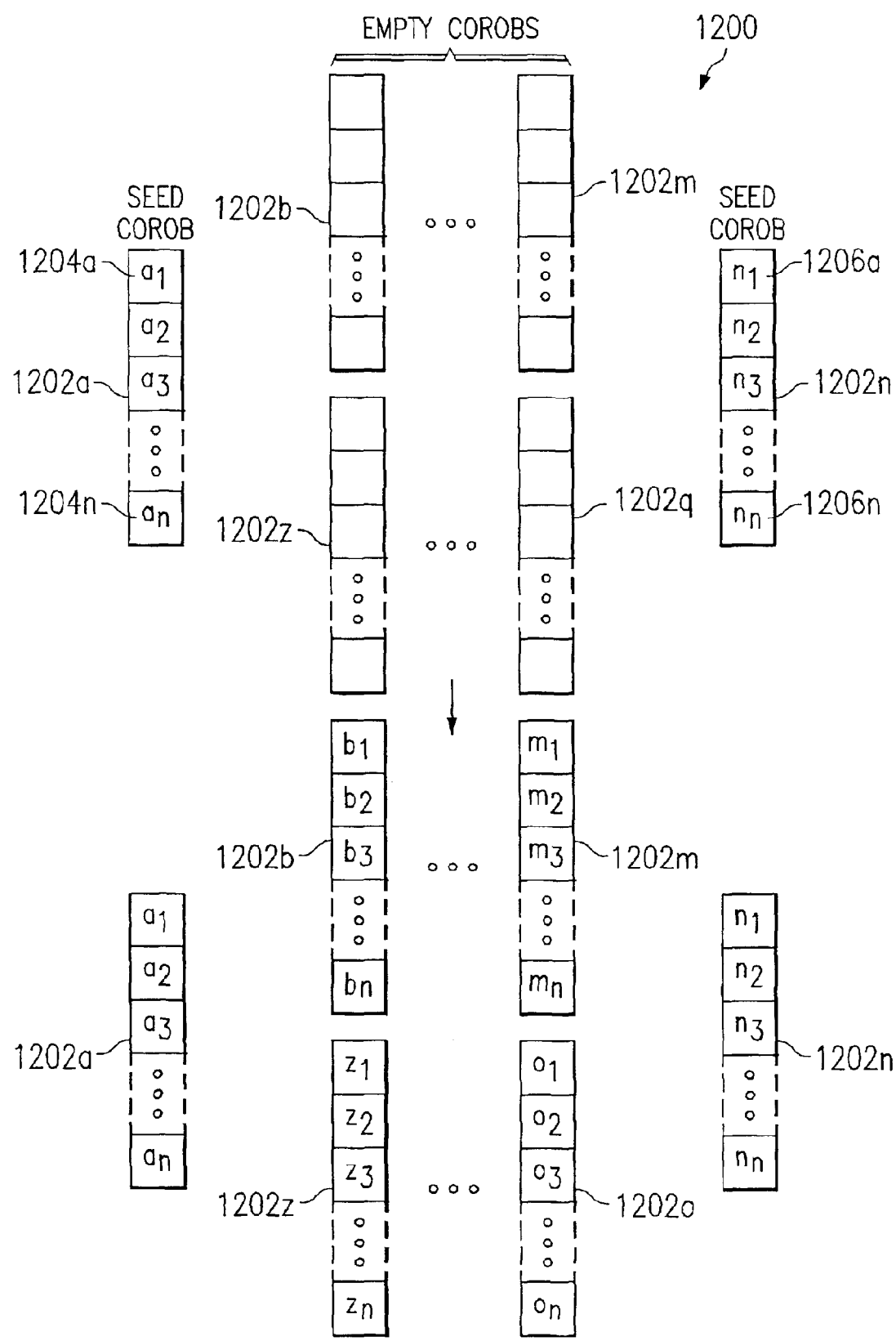
FIG. 12 is a diagram illustrating the generation of a ring corob using another interpolation process in accordance with the present invention.

FIG. 12 is a diagram illustrating the generation of a ring corob 1200 using another interpolation process in accordance with the present invention. String corob generator 110 starts with two seed corobs 1202a and 1202n, which contain entries 1204a–1204n and 1206a–1206n, respectively. String corob generator 110 also generates two sets of empty corobs 1202b–1202m and 1202o–1202z.

In this embodiment, seed corobs 1202a and 1202n represent corobs 1202 on opposing sides of ring corob 1200. To produce the remaining corobs 1202 in ring corob 1200, string corob generator 110 performs a non-linear interpolation in one direction around the ring to generate entries in one set of empty corobs 1202b–1202m. String corob generator 110 also performs a non-linear interpolation in the other direction around the ring to generate entries in the other set of empty corobs 1202o–1202z. By performing two non-linear interpolations around the ring, string corob generator 110 may produce a ring corob 1200. String corob generator 110 may perform any suitable non-linear interpolation to generate corobs 1202b–1202m and corobs 1202o–1202z.

Figure 13:
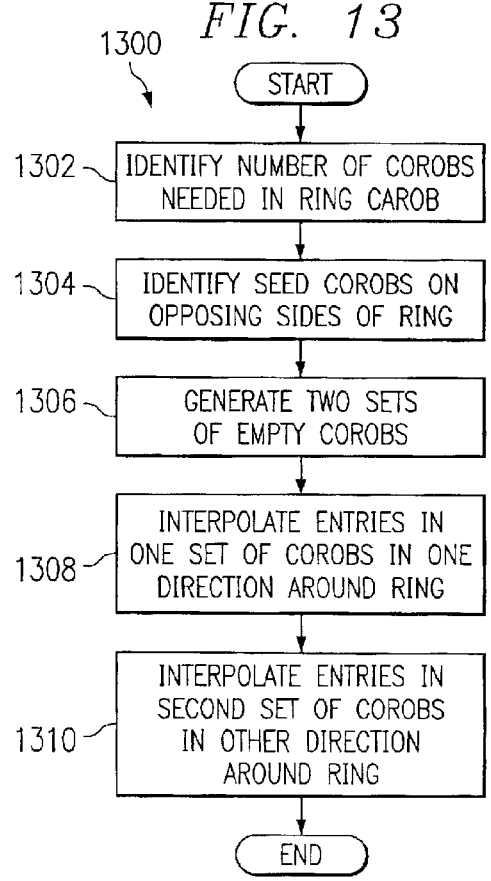
FIG. 13 is a flow diagram illustrating another exemplary method for generating a ring corob using an interpolation process in accordance with the present invention.

FIG. 13 is a flow diagram illustrating another exemplary method 1300 for generating a ring corob 1200 using an interpolation process in accordance with the present invention. String corob generator 110 identifies the number of corobs 1202 needed in ring corob 1200 at step 1302. String corob generator 110 identifies two seed corobs 1202a and 1202n on opposing sides of the ring at step 1304. The seed corobs 1202a and 1202n may be received by string corob generator 110 from an application 128 or other component of system 100, generated by string corob generator 110, or obtained in any other suitable manner. String corob generator 110 generates two sets of one or more empty corobs 1202b–1202m and 1202o–1202z at step 1306.

String corob generator 110 interpolates entries in one set of empty corobs 1202b–1202m using a non-linear interpolation process at step 1308. This may include, for example, string corob generator 110 using one seed corob 1202a as the starting point for the interpolation and the other seed corob 1202n as the ending point for the interpolation. String corob generator 110 interpolates entries in the other set of empty corobs 1202o–1202z using a non-linear interpolation process at step 1310. This may include, for example, string corob generator 110 using one seed corob 1202n as the starting point for the interpolation and the other seed corob 1202a as the ending point for the interpolation. At this point, corobs 1202b–1202m link seed corobs 1202a and 1202n in one direction along the ring, and corobs 1202o–1202z link seed corobs 1202a and 1202n in the other direction along the ring. The corobs 1202 have no discernible endpoints, so corobs 1202 form a ring corob 1200.

Figure 14A:
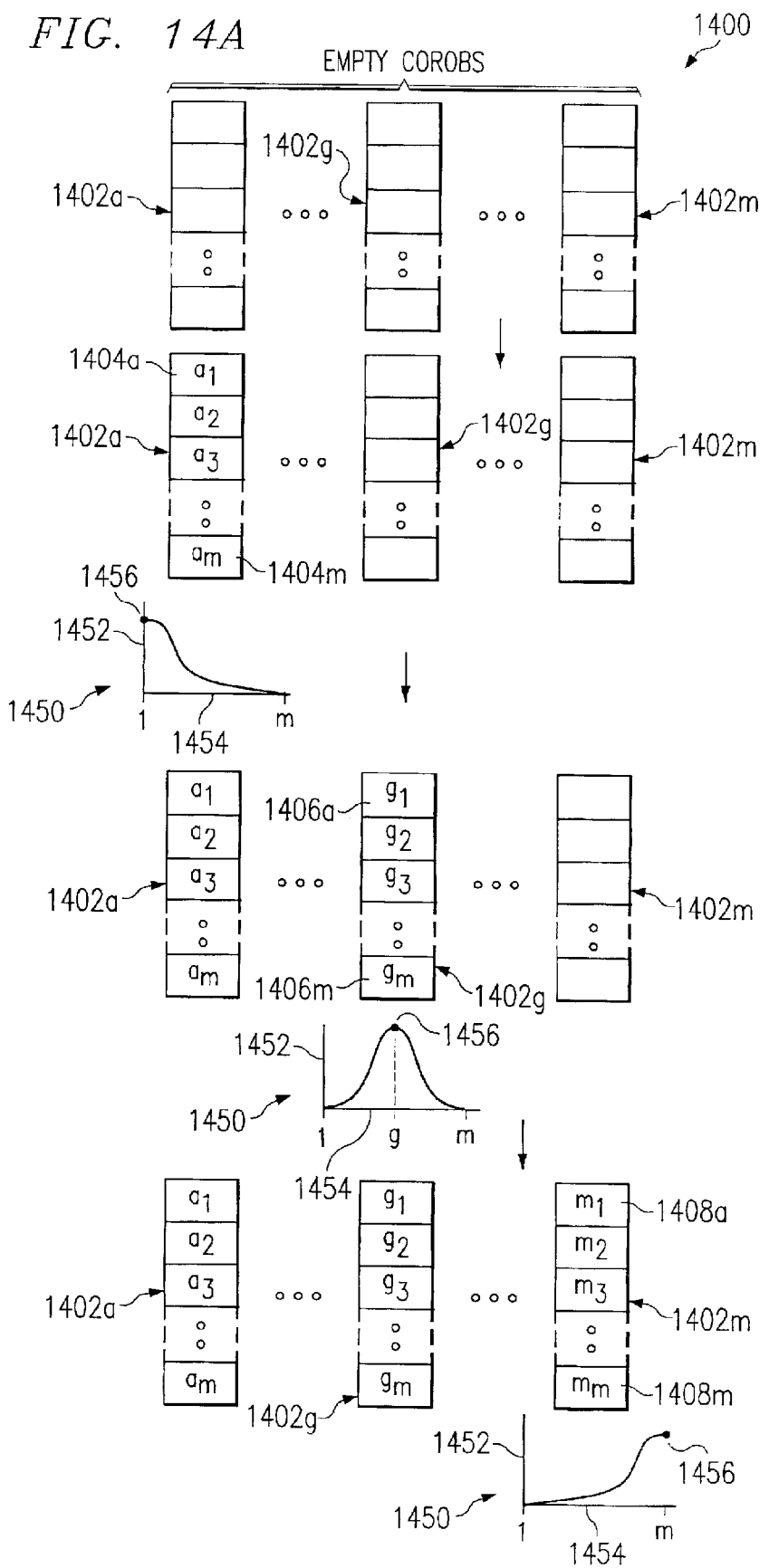
FIGS. 14A and 14B are diagrams illustrating the generation of a string corob using an overlapping function process in accordance with the present invention.
Figure 14B:
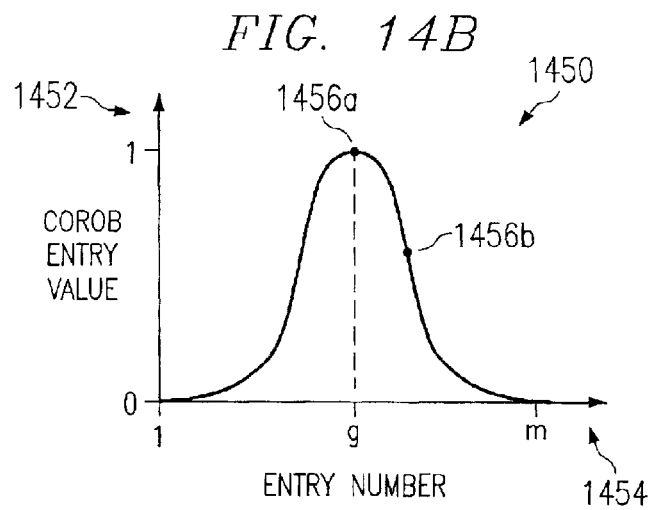

FIGS. 14A and 14B are diagrams illustrating the generation of a string corob 1400 using an overlapping function process in accordance with the present invention. In particular, FIG. 14A illustrates the generation of the string corob 1400, and FIG. 14B illustrates the function 1450 used to generate entries in the corobs of string corob 1400.

As shown in FIG. 14A, string corob generator 110 generates a set of empty corobs $1402a$–$1402^{62}m$. String corob generator 10 may then use a function 1450 to generate the entries in corobs 1402a–1402m. An example function 1450 is shown in FIG. 14B. The function 1450 illustrated in FIG. 14B represents a gaussian function, although any other suitable function may be used without departing from the scope of the present invention. As shown in FIG. 14B, function 1450 associates an entry number 1454 with an entry value 1452. In this embodiment, each entry in a corob 1402 may be numbered and have an associated index or entry number. As a particular example, the first entry 1406a in corob 1402g may be indexed by a value of one, and the last entry 1406m may be indexed by a value of m. String corob generator 110 may generate entries 1406 by executing function 1450 using the index or entry number associated with each entry 1406. For example, string corob generator 110 could execute function 1450 using an entry number 1454 of one to produce entry 1406a, and string corob generator 110 could execute function 1450 using an entry number 1454 of g to produce entry 1406g. This produces a corob 1402g having entries generated using function 1450.

To produce entries for different corobs 1402, string corob generator 110 shifts the position of function 1450. As shown in FIG. 14B, function 1450 may have one or more centering points 1456. The centering point 1456 allows string corob generator 110 to center function 1450 over different entry numbers 1454. For example, each corob 1402 may be numbered and have an associated index number. As a particular example, the first corob 1402a may be indexed by a value of one, and the last corob 1402m may be indexed by a value of m. String corob generator 110 may generate entries for a corob 1402 by placing the centering point 1456 of function 1450 over the entry number 1454 that equals the index associated with corob 1402. For example, as shown in FIG. 14A, string corob generator 110 may place centering point 1456 of function 1450 over an entry number 1454 of one to produce entries for corob 1402a. Similarly, string corob generator 110 may place centering point 1456 over an entry number 1454 of g to produce entries for corob 1402g, and string corob generator 110 may place centering point 1456 over an entry number 1454 of m to produce entries for corob 1402m. By centering function 1450 over different entry numbers 1454, string corob generator 110 may generate different corobs 1402. Centering point 1456 may represent any point along the function 1450. Although string corob generator 110 may be described as using centering point 1456a, string corob generator 110 may use any other suitable location in function. 1450 as centering point 1456.

In one aspect of operation, string corob generator 110 places the centering point 1456 of function 1450 over a value 1454 of one. After that, string corob generator 110 generates entries 1404a–1404m in corob 1402a using function 1450. In the illustrated embodiment, function 1450 has a maximum value 1452 at its centering point 1456. As a result, entry 1404a may have the largest value in corob 1402a.

A similar process may be used to generate corobs 1402b–1402m. String corob generator 110 places the centering point 1456 of function 1450 over different values 1454 and generates entries for corobs 1402b–1402m at those different values 1454. For example, to generate entries 1406a–1406m for corob 1402g, string corob generator 110 places the centering point 1456 of function 1450 over a value 1454 of g. String corob generator 110 then generates entries 1406a–1406m using function 1450 centered at a value of g. Because function 1450 has a maximum value 1452 at its centering point 1456, entry 1406g may have the largest value in corob 1402g. To generate entries 1408a–1408m for corob 1402m, string corob generator 110 places the centering point 1456 of function 1450 over a value 1454 of m. String corob generator 110 then generates entries 1408a–1408m using function 1450 centered at a value of m.

By using a different centering point 1456 to generate entries in different corobs 1402, the function 1450 generates different entries for those corobs 1402. By varying the degree to which the centering point 1456 changes between two corobs 1402, string corob generator 110 may generate corobs 1402 that are closer together or farther apart than standard distance. As a result, the use of function 1450 allows string corob generator 110 to produce a string corob 1400.

Figure 15:
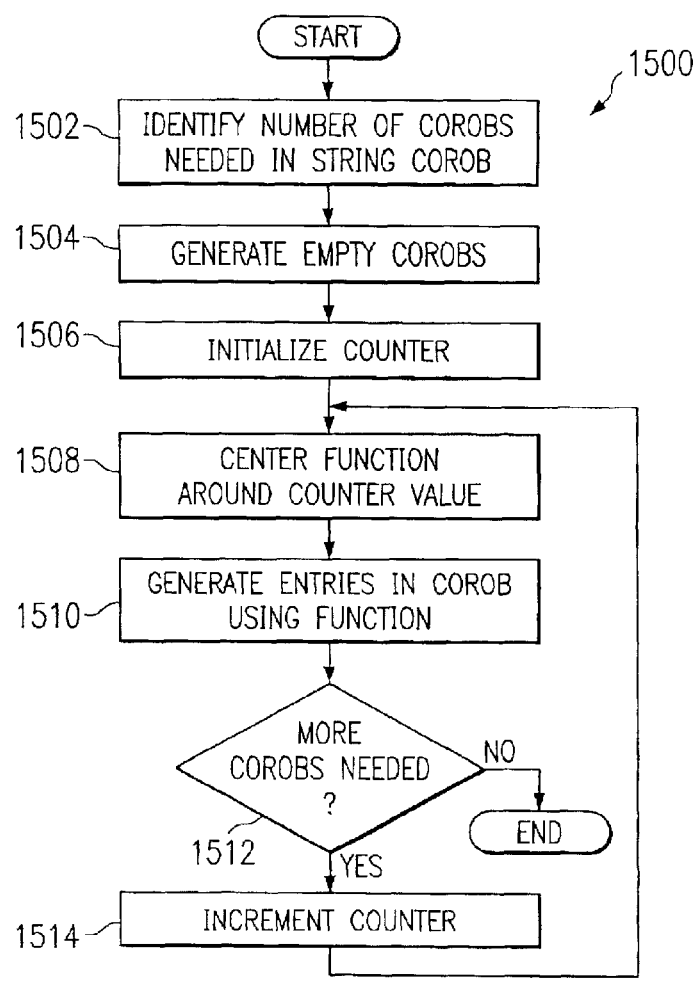
FIG. 15 is a flow diagram illustrating an exemplary method for generating a string corob using an overlapping function process in accordance with the present invention.

FIG. 15 is a flow diagram illustrating an exemplary method 1500 for generating a string corob 1400 using an overlapping function process in accordance with the present invention. String corob generator 110 identifies the number of corobs 1402 needed in string corob 1400 at step 1502. String corob generator 110 generates empty corobs 1402a–1402m at step 1504. String corob generator 110 initializes a counter at step 1506. This may include, for example, string corob generator 110 initializing the counter to a value of one. The counter may act as the index to the corobs 1402 being produced by string corob generator 110. String corob generator 110 centers a function 1450 used to generate entries in corobs 1402 at step 1508. This may include, for example, string corob generator 110 placing centering value 1456 of function 1450 over a value 1454 equal to the value of the counter.

String corob generator 110 uses function 1450 to generate the entries 1404 in a corob 1402a at step 1510. This may include, for example, string corob generator 110 identifying an entry value 1452 for each of the entries 1404 in corob 1402a by executing function 1450 using the entry numbers 1454 of entries 1404. String corob generator 110 determines whether entries in more corobs 1402 need to be generated at step 1512. This may include, for example, string corob generator 110 comparing the number of corobs 1402 currently containing entries in string corob 1400 with the total number of corobs 1402 needed in string corob 1400. If additional corobs 1402 need to be processed, string corob generator 110 increments the value of the counter at step 1514. This may include, for example, incrementing the counter by a value of one. String corob generator 110 then returns to step 1508 to center function 1450 around the new value of the counter and generate another corob 1402. String corob generator 110 repeats this process until the entries in corobs 1402a–1402m are generated, producing a string corob 1400.

While FIG. 15 illustrates one method 1500 for generating a string corob 1400 using overlapping functions, various changes may be made to method 1500 without departing from the scope of the present invention. For example, while string corob generator 110 has been described as initializing and incrementing a counter, string corob generator 110 could initialize the counter to a value of m and decrement the counter after producing each corob 1402m–1402a.

Figure 16A:
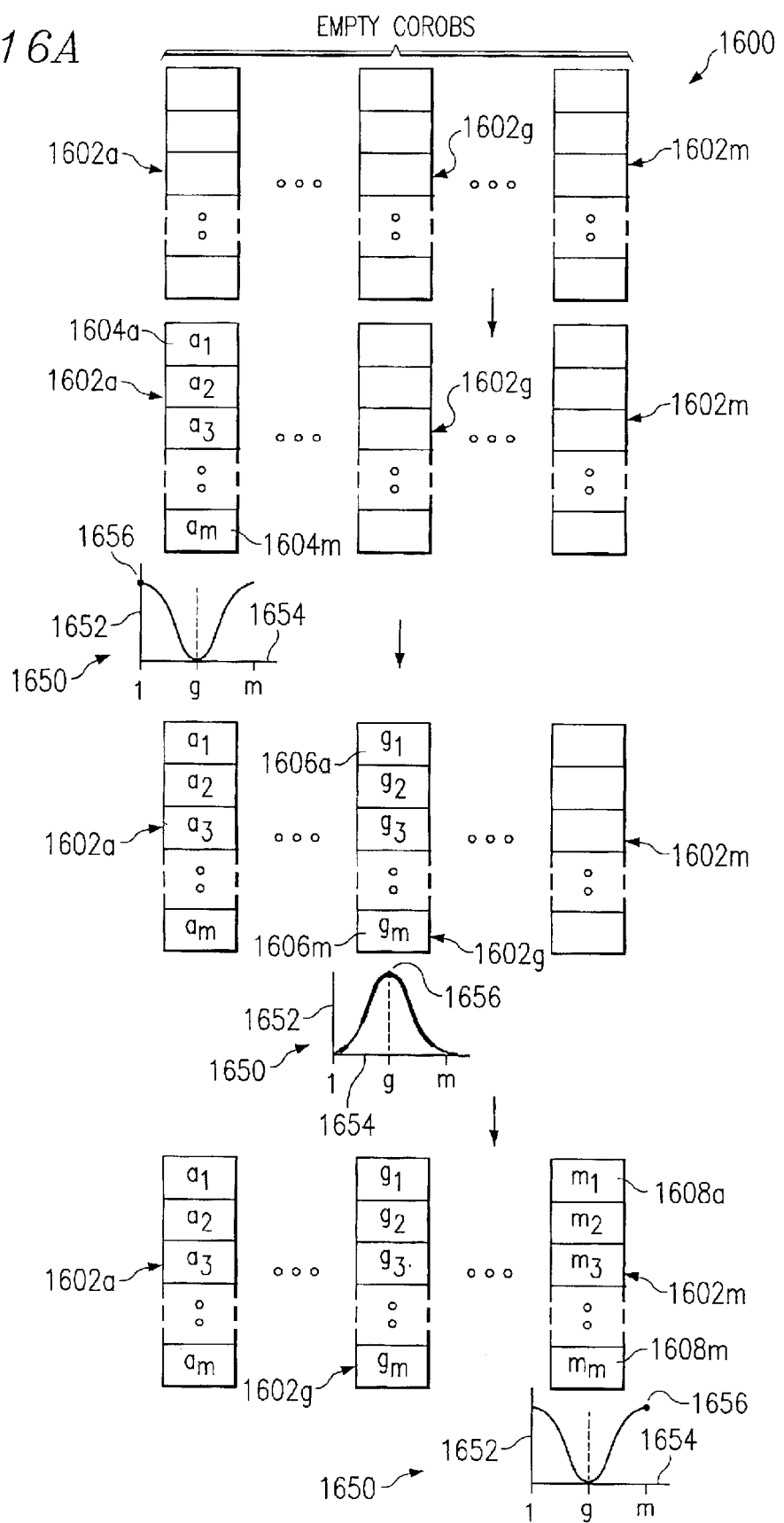
FIGS. 16A and 16B are diagrams illustrating the generation of a ring corob using an overlapping function process in accordance with the present invention.
Figure 16B:
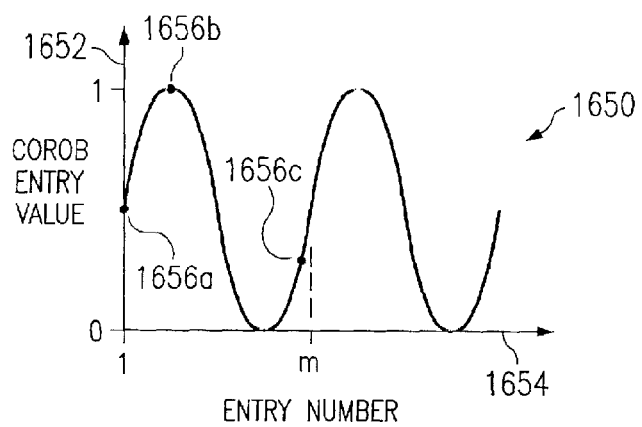

FIGS. 16A and 16B are diagrams illustrating the generation of a ring corob 1600 using an overlapping function process in accordance with the present invention. In particular, FIG. 16A illustrates the generation of the ring corob 1600, and FIG. 16B illustrates the function 1650 used to generate ring corob 1600.

As shown in FIG. 16A, string corob generator 110 generates a set of empty corobs 1602a–1602m. String corob generator 110 then uses a function 1650 to generate the entries in corobs 1602a–1602m. An example function 1650 is shown in FIG. 16B. The function 1650 illustrated in FIG. 16B represents a sine function. Any other suitable unction that is periodic may be used without departing from the scope of the present invention. In a particular embodiment, a function that is periodic and that has an interval less than or equal to the number of corobs 1602 in ring corob 1600 may be used. For example, another function 1650 may be a sin(x)/x curve.

String corob generator 110 uses the function 1650 to generate the entries of corobs 1602. In the illustrated embodiment, function 1650 has one or more centering points 1656. One of the centering points 1656 may be used by string corob generator 110 to produce different corobs 1602. While string corob generator 110 may be described as using centering point 1656b, any other suitable centering points 1656 may be used without departing from the scope of the present invention.

String corob generator 110 uses function 1650 to produce entries 1604a–1604m in first corob 1602a. String corob generator 110 places the centering point 1656 of function 1650 over a value 1454 of one. After that, string corob generator 110 generates entries 1604a–1604m using function 1650. A similar process may be used to generate corobs 1602b–1602m. String corob generator 110 places the centering point 1656 of function 1650 over a value 1654 and then generates entries for a corob 1602. For example, to generate entries 1606a–1606m for corob 1602g, string corob generator 110 places the centering point 1656 of function 1650 over a value 1654 of g. String corob generator 110 then generates entries 1606a–1606m using function 1650 centered at a value of g. To generate entries 1608a–1608m for corob 1602m, string corob generator 110 places the centering point 1656 of function 1650 over a value 1654 of m. String corob generator 110 then generates entries 1608a–1608m using function 1650 centered at a value of m.

By using a different centering point 1656 to generate entries in different corobs 1602, the function 1650 generates different entries for those corobs 1602. By varying the degree to which the centering point 1656 changes between two corobs 1602, string corob generator 110 may generate corobs 1602 that are closer together or farther apart than standard distance. As a result, the use of function 1650 allows string corob generator 110 to produce a string corob. Also, because the function 1650 used by string corob generator 110 is periodic, corobs 1602a and 1602m may be closer together or farther apart than standard distance. As a result, corobs 1602 form a ring corob.

A method for generating a ring corob 1600 may be the same as or similar to the method 1500 illustrated in FIG. 15. Using a periodic function such as function 1650, string corob generator 110 may use method 1500 to generate ring corob 1600.

Figure 17A:
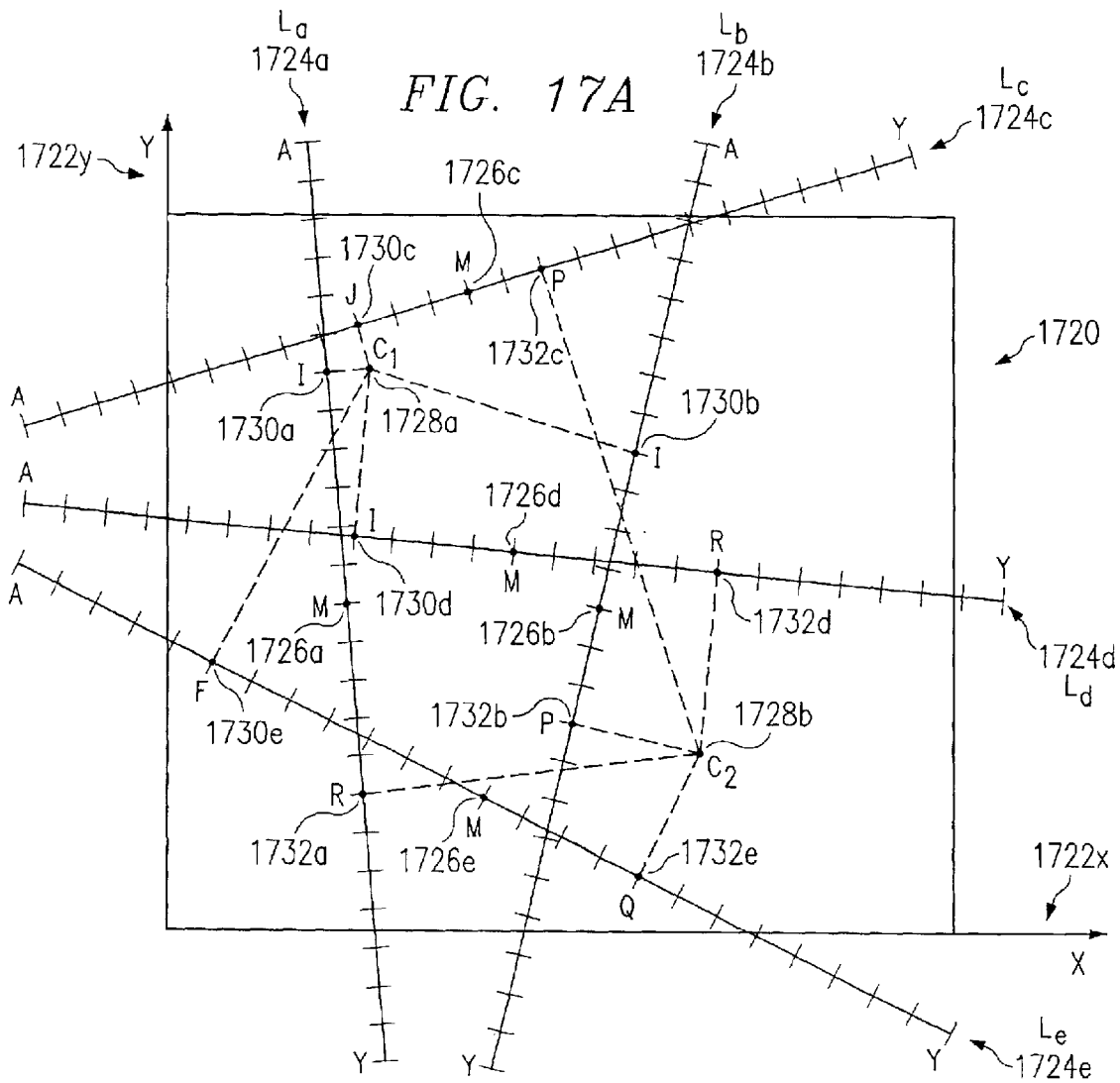
FIGS. 17A through 17C are diagrams illustrating the generation of a string corob using a projection process in accordance with the present invention.
Figure 17B:
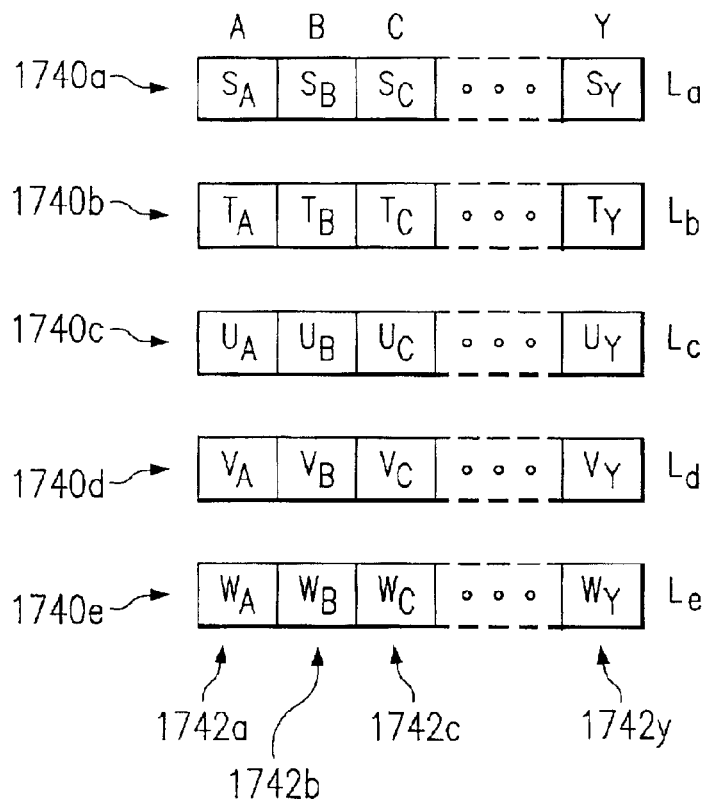
Figure 17C:
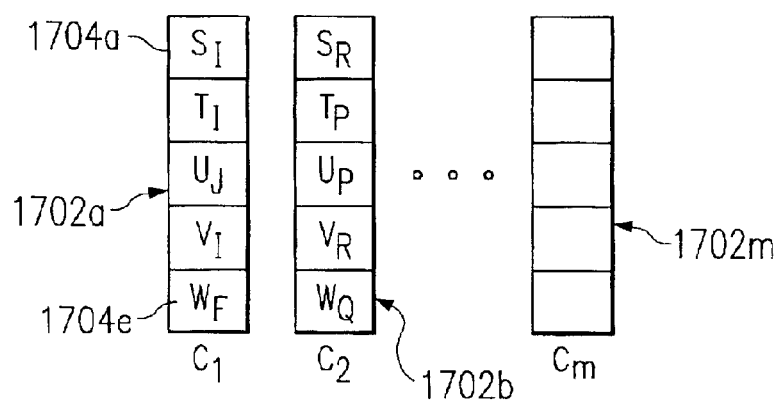

FIGS. 17A through 17C are diagrams illustrating the generation of a string corob 1700 using a projection process in accordance with the present invention. In particular, FIG. 17A illustrates the projection of a point in geometric space onto a plurality of lines, FIG. 17B illustrates sequences of values associated with the lines in FIG. 17A, and FIG. 17C illustrates the corobs 1702 generated using the projection process.

In FIG. 17A, a geometric space 1720 has two dimensions 1722x and 1722y. In geometric space 1720, a plurality of lines 1724a–1724e are defined. Each line 1724 may be defined using the formula:

$$Y = C_1 * X + C_2$$

where X represents a value along axis 1722x, Y represents a value along axis 1722y, and $C_1$ and $C_2$ represent constants. Each line 1724 may have a midpoint 1726 that lies within the geometric space 1720. The endpoints of lines 1724 may or may not lie within geometric space 1720. Each line 1724a–1724e is associated with a sequence of values 1740a–1740y, respectively, which are illustrated in FIG. 17B. In one embodiment, each sequence 1740a–1740y represents a plurality of values 1742a–1742y produced using a random walk or other suitable process.

In operation, string corob generator 110 selects two or more points 1728 in geometric space 1720. For each point 1728, string corob generator 110 projects the point 1728 onto the lines 1724 in geometric space 1720. In one embodiment, string corob generator 110 performs a perpendicular projection of point 1728 onto lines 1724. For example, string corob generator 110 may select a point 1728a in geometric space 1720 and project that point 1728a onto lines 1724. By projecting point 1728 onto lines 1724a–1724e, string corob generator 110 identifies points 1730a–1730e along lines 1724a–1724e.

Each point 1730 along a line 1724 may be used as an index into the sequence of values 1740 associated with that line 1724. For example, if a point 1730 has a value of c, string corob generator 110 may access a sequence 1740 and select the cth entry, or value 1742c. Similarly, if a point 1730 has a value of q, string corob generator 110 may access a sequence 1740 and select the qth entry, or value 1742q. String corob generator 110 may then use that value 1742 as an entry in a corob 1702. For example, if a value 1742 is selected from sequence 1740a, the value 1742 may be used as entry 1704a in a corob 1702. If a value 1742 is selected from sequence 1740d, the value 1742 may be used as entry 1704d in corob 1702. By combining one value 1742 from each sequence 1740, string corob generator 110 may generate a corob 1702 that corresponds to a point 1728 in geometric space 1720.

As a particular example, string corob generator 110 may project point 1728a onto lines 1724 and identify points 1730a–1730e. Points 1730a–1730e have values of i, i, j, i, and f, respectively. String corob generator 110 accesses sequences 1740a–1740e and retrieves values $1742_i$ ($S_I$), $1742i$ ($T_I$), $1742j$ ($U_J$), $1742i$ ($V_I$), and $1742f$ ($W_F$), respectively. String corob generator 110 then combines these values 1742 to produce corob 1702a. Similarly, string corob generator 110 may project point 1728b onto lines 1724 and identify points 1732a–1732e. Points 1732a–1732e have values of r, p, p, r, and q, respectively. String corob generator 110 accesses sequences 1740a–1740e and retrieves values $1742r$ ($S_R$), $1742_p$ ($T_P$), $1742_p$ ($U_P$), $1742r$ ($V_R$), and $1742q$ ($W_Q$), respectively. String corob generator 110 then combines these values 1742 to produce corob 1702b.

String corob generator 110 may select a series of points 1728 in geometric space 1720 and generate a corob 1702 for each point 1728. For example, string corob generator 110 may select one or more additional points that lie between points 1728a and 1728b. By generating a corob 1702 for each of these points, string corob generator 110 may generate corobs 1702 that are closer together or farther apart than standard distance. This creates a string corob 1700.

In one embodiment, the point 1730 along a line 1724 may fractionally identify two values 1742. For example, point 1730a could have a value between j and k. String corob generator 110 may take any suitable action if a point 1730 lies between two values on a line 1724. For example, string corob generator 110 may identify which value 1742 the point 1730 represents more, and string corob generator 110 may use that value 1742 from a sequence 1740. As a particular example, if point 1730a lies closer to j than to k, string corob generator 110 could select value 1742j from sequence 1740a. In another embodiment, string corob generator 110 may use both values 1742 and perform an interpolation on the values 1742. For example, if point 1730a lies halfway between values j and k, string corob generator 110 could retrieve values 1742j and 1742k from sequence 1740a and combine half of value 1742j and half of value 1742k. In a similar manner, if point 1730a lies a third of the way between values j and k, string corob generator 110 could combine two thirds of value 1742j and one third of value 1742k. String corob generator 110 could also take any other suitable actions.

FIG. 18 is a flow diagram illustrating an exemplary method 1800 for generating a string corob 1700 using a projection process in accordance with the present invention. String corob generator 110 identifies the number of corobs 1702 needed in string corob 1700 at step 1802. String corob generator 110 generates empty corobs 1702a–1702m at step 1804. String corob generator 110 generates lines 1724 through a geometric space 1720 at step 1806. This may include, for example, string corob generator 110 selecting constants to use in the line equation shown above. String corob generator 110 generates a sequence 1740 of values 1742 for each line 1724 at step 1808. This may include, for example, string corob generator 110 performing the random walk process illustrated in FIG. 5. String corob generator 110 may also receive the sequences 1740 from an application 128, retrieve sequences 1740 that were previously generated and stored in memory 132, or obtain the sequences 1740 in any other suitable manner.

String corob generator 110 selects a point 1728 in geometric space 1720 at step 1810. This may include, for example string corob generator 110 randomly selecting coordinates of point 1728 along axes 1722. String corob generator 110 projects point 1728 onto lines 1724 at step 1812. This may include, for example, using sine and cosine functions to identify a point 1730 along each line 1724.

String corob generator 110 identifies the value 1742 from each sequence 1740 that corresponds to the projected location 1730 of point 1728 at step 1814. This may include, for example, string corob generator 110 identifying the value of a point 1730 along a line 1724. This may also include string corob generator 110 using that value 1730 as an index to access a sequence 1740 and retrieve a value 1742 from sequence 1740. String corob generator 110 combines the values 1742 retrieved from sequences 1740 at step 1816. This produces a corob 1702.

String corob generator 110 determines whether entries for more corobs 1702 need to be generated at step 1818. This may include, for example, string corob generator 110 comparing the number of corobs 1702 currently containing entries 1704 with the total number of corobs 1702 needed in string corob 1700. If additional corobs 1702 are needed, string corob generator 110 selects another point 1728 in geometric space 1720 at step 1820. This may include, for example, string corob generator 110 selecting a second point 1728b that is close to or far from the first point 1728a String corob generator 110 then returns to step 1812 to generate another corob 1702. String corob generator 110 repeats this process until the entries in corobs 1702a–1702m are generated, producing a string corob 1700.

While FIGS. 17A through 17C and FIG. 18 illustrate example methods of generating a string corob 1700 using a projection process, various changes may be made without departing from the scope of the present invention. For example, any number of lines 1724 may be used, and each sequence 1740 may contain any number of values 1742. Also, in another embodiment, string corob generator 110 need not identify the number of corobs 1702 needed in string corob 1700 at step 1802. For example, string corob generator 110 may generate corobs 1702 by selecting different points 1728 in geometric space 1720. In a particular embodiment, string corob generator 110 may be programmed to select points 1728 in a grid formation in geometric space 1720, and string corob generator 110 may generate corobs 1702 without first determining the total number of corobs 1702 to be produced. In addition, geometric space 1720 may include any suitable number of dimensions, and the coordinate axes 1722 may or may not be orthogonal.

Figure 19:
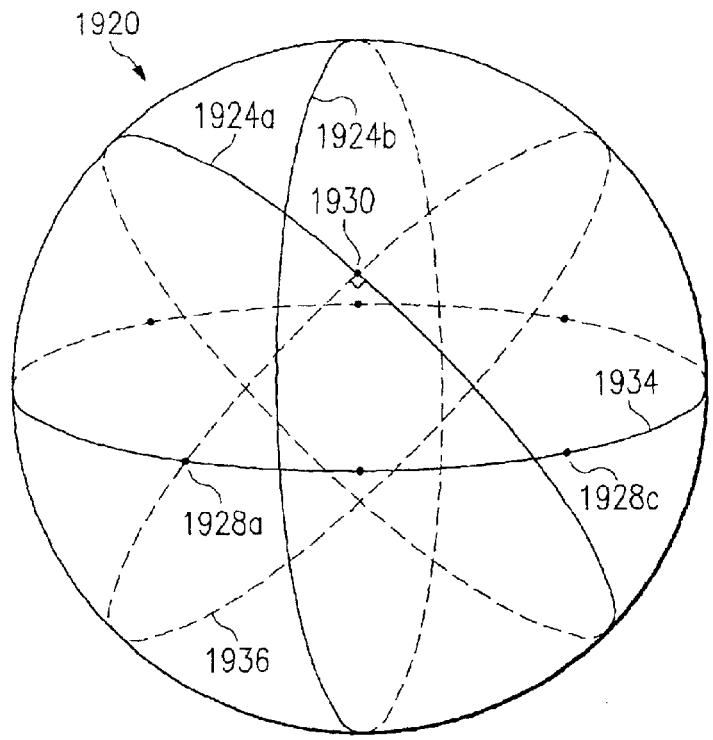
FIG. 19 is a diagram illustrating the generation of a ring corob using a projection process in accordance with the present invention.

FIG. 19 is a diagram illustrating the generation of a ring corob using a projection process in accordance with the present invention. In FIG. 19, a plurality of great circles 1924 are defined in a spherical geometric space 1920. A great circle 1924 is a line on the surface of the sphere that forms a circle having the same diameter as the equator 1934 of the sphere. A great circle 1924 may intersect the equator 1934 of the sphere at two locations. Each circle 1924 is associated with a sequence of values, such as values 1742a–1742y associated with line a 1724 in FIGS. 17A through 17C. In one embodiment, each sequence represents a plurality of values produced using a random walk, where there are no discernible endpoints in the sequence of values. In this embodiment, string corob generator 110 may generate the values so that the endpoints of the random walk are sufficiently closer together or farther apart, which may help to eliminate the appearance of endpoints in the sequence of values.

In one aspect of operation, string corob generator 110 selects two or more points 1928 along the equator 1934 of the sphere. For each point 1928, string corob generator 110 projects the point 1928 onto the great circles 1924 in geometric space 1920. In one embodiment, string corob generator 110 maps a point 1928 onto a circle 1924 by constructing a great circle 1936 that passes through point 1928 and forms a right angle with the circle 1924. This identifies a point 1930 along circle 1924, and point 1930 may be used as an index to access a sequence of values 1740 and retrieve a value 1742. String corob generator 110 may repeat this process for each great circle 1924, combine the values 1742, and generate a corob corresponding to point 1928. String corob generator 110 may repeat this process and generate a corob for each point 1928 along the equator 1934 of the sphere. These corobs form a ring corob.

String corob generator 110 may select a series of points 1928 in geometric space 1920 using any suitable method. For example, string corob generator 110 may select points 1928 that are evenly spaced around the equator 1934. By generating a corob for each point 1928, string corob generator 110 generates corobs that are closer together or farther apart than standard distance and that have no discernible endpoints, creating a ring corob.

FIG. 20 is a flow diagram illustrating an exemplary method 2000 for generating a ring corob using a projection process in accordance with the present invention. String corob generator 110 identifies the number of corobs needed in the ring corob at step 2002. In another embodiment, string corob generator 110 may generate a ring corob using the projection process without first determining a number of corobs to be produced. String corob generator 110 generates empty corobs at step 2004. String corob generator 110 generates great circles 1924 through a geometric space 1920 at step 2006. This may include, for example, string corob generator 110 selecting the constants for use in the circle equation shown above. String corob generator 110 generates a sequence of values for each great circle at step 2008. This may include, for example, string corob generator 110 performing the random walk process illustrated in FIG. 5. String corob generator 110 may perform the random walk so that the sequence of values is looped. In this embodiment, the sequence has no discernible endpoints. String corob generator 110 may also receive the sequences from an application 128, retrieve sequences that were previously generated and stored in memory 132, or identify the sequences using any other suitable method.

String corob generator 110 selects a point 1928 in geometric space 1920 at step 2010. This may include, for example string corob generator 110 selecting a point 1928 along the equator 1934 of the sphere in geometric space 1920. String corob generator 110 projects point 1928 onto circles 1924 at step 2012. This may include, for example, identifying a great circle that passes through point 1928 and that forms a right angle with a circle 1924.

String corob generator 110 identifies the value from each sequence that corresponds to the projected location of point 1928 along line 1924 at step 2014. This may include, for example, string corob generator 110 identifying the value of a point 1930 along a circle 1924. This may also include string corob generator 110 using that value as an index to access a sequence of values associated with circle 1924 and retrieve a value from the sequence. String corob generator 110 combines the values retrieved from the sequences at step 2016, producing a corob.

String corob generator 110 determines whether entries for more corobs need to be generated at step 2018. This may include, for example, string corob generator 110 comparing the number of corobs containing entries with the total number of corobs needed in the ring corob. If additional corobs are needed, string corob generator 110 selects another point 1928 in geometric space 1920 at step 2020. This may include, for example, string corob generator 110 selecting a second point 1928b along the equator 1934 of the sphere in geometric space 1920. String corob generator 110 then returns to step 2012 to generate another corob. String corob generator 110 repeats this process until the entries in the corobs are generated, producing a ring corob.

Figure 21A:
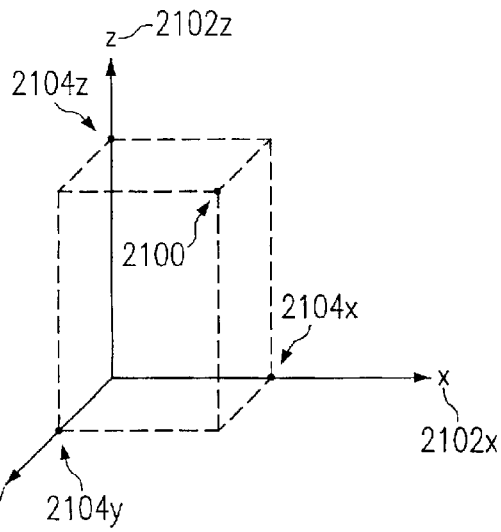
FIGS. 21A and 21B are diagrams illustrating an exemplary multi-dimensional corob constructed according to the teachings of the present invention.
Figure 21B:
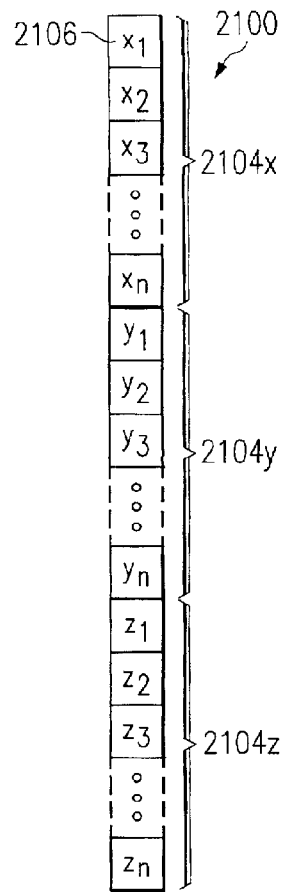

FIGS. 21A and 21B are diagrams illustrating an exemplary multi-dimensional corob 2100 constructed according to the teachings of the present invention. In particular, FIG. 21A is a diagram illustrating how multiple corobs 2104x, 2104y, and 2104z may be used to represent a multi-dimensional corob 2100, and FIG. 21B is a diagram illustrating an exemplary embodiment of multi-dimensional corob 2100. While FIGS. 21A and 21B are described with respect to a three-dimensional corob 2100, corobs having any number of dimensions may be used without departing from the scope of the present invention.

As described above, corobs may represent points in corob space, such as a point in space having one thousand dimensions. The corobs may be associated with one another by projecting or mapping the corobs into geometric space, such as by representing each corob by a point on a line. In one embodiment, which is illustrated in FIG. 21A, the geometric space comprises a three-dimensional space. In the illustrated embodiment, the geometric space is defined by three axes, an x-axis 2102x, a y-axis 2102y, and a z-axis 2102z. One or more corobs 2104 may be associated with or otherwise mapped onto an axis 2102. For example, corob 2104x is associated with a point along x-axis 2102x, corob 2104y is associated with a point along y-axis 2102y, and corob 2104z is associated with a point along z-axis 2102z.

To represent a point in the three-dimensional geometric space, the position of the point may be mapped onto each of the three axes 2102, and corobs 2104 may be used to identify the location of the point along the axes 2102. By identifying a corob 2104 along each axis 2102, the location of a point in the three-dimensional geometric space may be defined. A multi-dimensional corob 2100 may then be constructed by aggregating or otherwise combining the corobs 2104. For example, corob 2100 may be constructed by combining corobs 2104x, 2104y, and 2104z. One example embodiment of multi-dimensional corob 2100 is illustrated in FIG. 21B.

In FIG. 21B, multi-dimensional corob 2100 is formed from three corobs 2104x, 2104y, and 2104z. In one embodiment, a multi-dimensional corob 2100 is formed by concatenating two or more corobs 2104. For example, if each corob 2104 includes one hundred entries 2106, multi-dimensional corob 2100 would have three hundred entries 2106. Multi-dimensional corobs 2100 may be used to form string corobs. For example, two or more multi-dimensional corobs 2100 may form a string corob, where the distance between adjacent corobs 2100 in each dimension is less than or greater than the standard distance between random corobs in that dimension.

Figure 22:
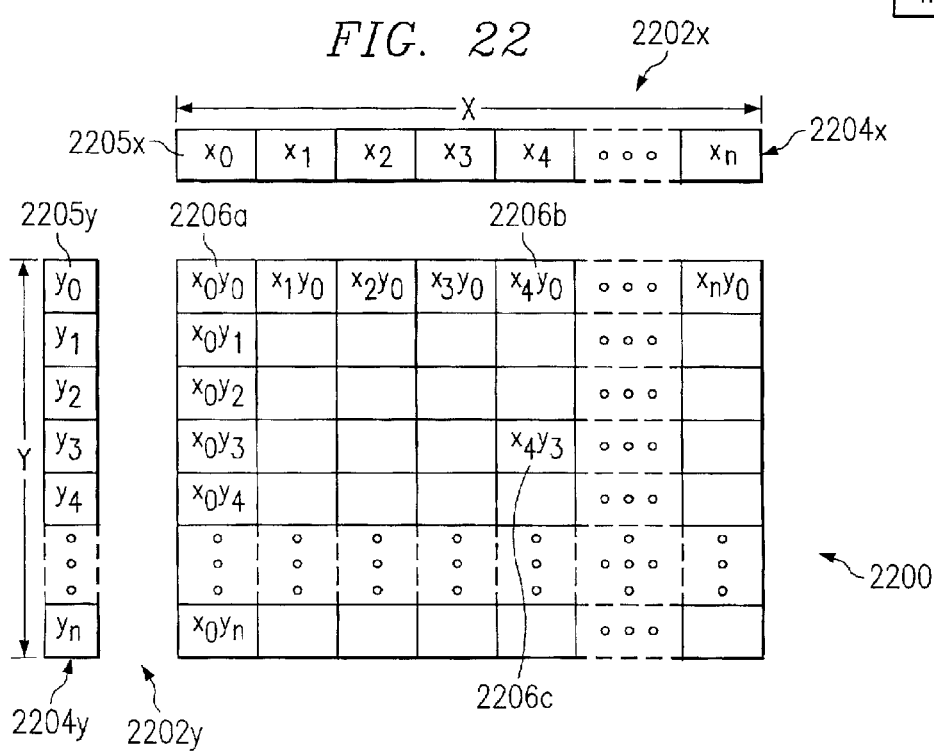
FIG. 22 is a diagram illustrating an exemplary coordinate system for generating multi-dimensional string corobs in accordance with the present invention.

FIG. 22 is a diagram illustrating an exemplary coordinate system 2200 for generating multi-dimensional string corobs in accordance with the present invention. In the illustrated embodiment, coordinate system 2200 includes two axes 2202x and 2202y. Axes 2202 may represent any suitable axes in a geometric space, such as orthogonal axes. A string corob 2204 is defined along each axis 2202. String corob 2204x is associated with axis 2202x, and string corob 2204y is associated with axis 2202y. Each string corob 2204 includes a plurality of corobs 2205. String corob 2204 may represent any suitable string corob, including a ring corob.

Using string corobs 2204, multi-dimensional corobs 2206 may be defined at various points along the axes 2202. In one embodiment, each multi-dimensional corob 2206 may be generated by concatenating a corob 2205x from string corob 2204x and a corob 2205y from string corob 2204y. For example, multi-dimensional corob 2206a may be produced by concatenating corobs $x_0$ and $y_0$, and multidimensional corob 2206b may be produced by concatenating corobs $x_4$ and $y_0$. Similarly, multi-dimensional corob 2206c may be produced by concatenating corobs $x_4$ and $y_3$.

By forming multi-dimensional corobs 2206 at different points along axes 2202, a multi-dimensional string corob may be produced. The use of two string corobs 2204 along axes 2202 helps to ensure that the distance between adjacent multi-dimensional corobs 2206 is smaller or greater than the standard distance between random corobs in both dimensions.

The string corobs 2204 generated for axes 2202 may be produced using any suitable method. For example, the string corobs 2204 could be generated using any of the method illustrated in FIGS. 3 through 20. If string corobs 2204 are generated using a method for producing ring corobs, the multidimensional corobs 2206 created using ring corobs 2204 may also form a multidimensional ring corob.

Figure 23:
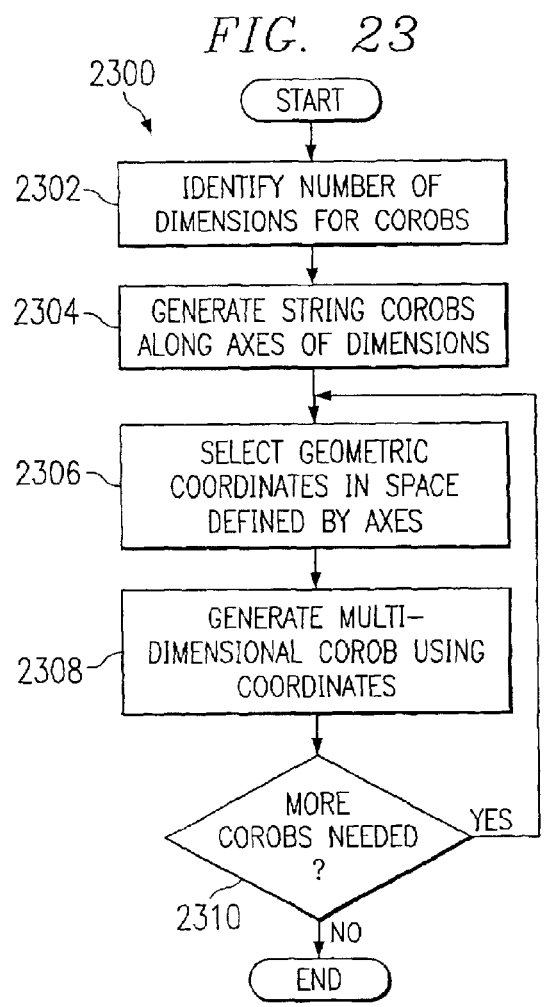
FIG. 23 is a flow diagram illustrating an exemplary method for generating a multi-dimensional string corob in accordance with the present invention.

FIG. 23 is a flow diagram illustrating an exemplary method 2300 for generating a multi-dimensional string corob in accordance with the present invention. String corob generator 110 identifies the number of dimensions 2202 of the corobs 2206 at step 2302. This may include, for example, string corob generator 110 receiving information from an application 128 identifying the number of dimensions 2202. String corob generator 110 generates a string corob 2204 for each dimension 2202 at step 2304. This may include, for example, string corob generator 110 generating a string corob 2204 along orthogonal axes 2202. Other suitable types of coordinate systems, such as cylindrical or spherical coordinate systems, may be used without departing from the scope of the present invention. String corob generator 110 may use any suitable method for generating string corobs 2205, including the methods illustrated in FIGS. 3 through 20 described above.

String corob generator 10 selects geometric coordinates in the space defined by the axes 2202 at step 2306. This may include, for example, string corob generator 110 selecting a random point in coordinate system 2200, or string corob generator 110 selecting a predetermined entry 2206. String corob generator 110 generates a multi-dimensional corob 2206 using the selected geometric coordinates at step 2306. This may include, for example, string corob generator 110 identifying the corob 2205 in each string corob 2204 that is associated with the selected geometric coordinates. This may also include string corob generator 110 concatenating or otherwise combining corobs 2205 to produce multi-dimensional corob 2206.

String corob generator 110 determines whether more multi-dimensional corobs 2206 are needed in the string corob at step 2310. This may include, for example, string corob generator 110 comparing the number of multidimensional corobs 2206 generated to the number of corobs needed. If more corobs 2206 are needed, string corob generator 110 returns to step 2306 to select additional geometric coordinates. String corob generator 110 may select another random set of geometric coordinates, or string corob generator 110 may select the next geometric coordinates in a predetermined set of coordinates. For example, in one embodiment, string corob generator 110 may produce a multi-dimensional corob 2206 for each combination of a corob 2205x and a corob 2205y, and string corob generator 110 may produce the multi-dimensional corobs 2206 going row-by-row, column-by-column, or any other suitable order. In another embodiment, string corob generator 110 may produce a multi-dimensional corob 2206 traveling diagonally in the coordinate system 2200.

While FIGS. 21 through 23 illustrate one example method for generating multi-dimensional string corobs, other methods may be used without departing from the scope of the present invention. For example, the various methods illustrated in FIGS. 3 through 20 may be expanded to produce multi-dimensional string corobs. As particular examples, a seed multi-dimensional corob 2100 may be selected, and a multi-dimensional string corob may be produced by performing a random walk using the seed corob as illustrated in FIGS. 3 through 7. Also, two seed multi-dimensional corobs 2100 may be selected, and a multi-dimensional string corob may be produced by interpolating the remaining corobs in the string as illustrated in FIGS. 8 through 13. Further, a multi-dimensional function f(x, y) could be used to produce the entries in two-dimensional corobs using the overlapping function process illustrated in FIGS. 14 through 16. Functions having a larger number of dimensions could be used to produce higher-dimensional corobs. In addition, string corob generator 110 could perform a projection process as illustrated in FIGS. 17–19 to generate the corobs that form a multi-dimensional corob 2100.

Although some of the methods for generating string corobs include string corob generator 110 determining a number of corobs to generate, string corob generator 110 could perform those methods without first determining a number of corobs to produce. For example, string corob generator 110 could perform a method recursively until enough corobs have been generated to meet a particular condition, such as a condition set by the application 128 requesting the string corob. Also, some of the methods have been described as including steps such as incrementing counters and/or shifting entries in one direction. These methods could also function by decrementing counters and/or shifting entries in the other direction.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A system for processing data, comprising:

a memory operable to store a plurality of correlithm objects, each correlithm object comprising a plurality of values defining a point in a particular space, the particular space defined by a plurality of dimensions and including a plurality of points; and a processor operable to generate at least some of the values in at least a portion of the correlithm objects, a distance between a first point associated with one of the correlithm objects and each of the plurality of points in the particular space defining a distribution having a mean and a standard deviation such that a ratio of the mean to the standard deviation increases with the number of dimensions of the particular space, a distance between the first point and a second point associated with another of the correlithm objects being substantially larger than the mean of the distribution.

2. The system of claim 1, wherein:

the memory stores at least one first correlithm object comprising a plurality of first values; and the processor generates at least one second correlithm object comprising a plurality of second values.

3. The system of claim 2, wherein the processor generates the second correlithm objects using a random walk and the first correlithm object.

4. The system of claim 3, wherein the processor generates the second values in one of the second correlithm objects by:

identifying a window of random values for each first value;

selecting a random value from each window of random values; and combining each random value selected from a window with the first value associated with the window to produce the second values in one of the second correlithm objects.

5. The system of claim 2, wherein the processor interpolates the second values in the second correlithm objects using the first values in two first correlithm objects.

6. The system of claim 5, wherein the processor performs a linear interpolation.

7. The system of claim 6, wherein the processor interpolates the second values in one of the second correlithm objects by:

selecting a fractional value between zero and one;

subtracting each first value in one of the first correlithm objects from the associated first value in the other first correlithm object to produce a plurality of difference values;

multiplying the difference values by the fractional value to produce a plurality of interpolation values; and adding the interpolation values to the first values in one of the first correlithm objects to produce the second values in one of the second correlithm objects.

8. The system of claim 1, wherein the processor generates the correlithm objects using a function having a different centering point for each of the correlithm objects.

9. The system of claim 8, wherein:

each value in one of the correlithm objects is associated with an index value; and the processor is operable to generate the values in one of the correlithm objects by executing the function using the index values.

10. The system of claim 8, wherein the function comprises a gaussian function.

11. The system of claim 10, wherein the centering point of the gaussian function is associated with a maximum value of the gaussian function.

12. The system of claim 8, wherein:

each correlithm object is associated with an index value; and the processor is operable to generate the values in one of the correlithm objects by assigning the centering point equal to the index value of the correlithm object.

13. The system of claim 1, wherein the processor generates the correlithm objects by:

selecting a plurality of second points in a geometric space;

projecting each second point onto a plurality of lines in the geometric space, each line associated with a sequence of values; and determining the values in the correlithm objects using positions of the projected second points along the lines and the sequences of values associated with the lines.

14. The system of claim 13, wherein the geometric space comprises a two-dimensional unit square.

15. The system of claim 13, wherein the processor determines the values in the correlithm objects by:

determining an index value based on the position of the projected second point along one of the lines; and using the index value to select at least one of the values from the sequence of values associated with the line.

16. The system of claim 1, wherein the mean is approximately $$\sqrt{\frac{N}{6}},$$

where N equals the number of dimensions in the particular space, and the standard deviation approaches 0.24 as N increases.

17. The system of claim 1, wherein the correlithm objects form at least a portion of a ring correlithm object.

18. The system of claim 1, wherein the processor is further operable to generate a ring correlithm object using the correlithm objects.

19. The system of claim 18, wherein the processor is operable to generate the ring correlithm object by shifting at least a portion of the values within the correlithm objects.

20. The system of claim 1, wherein the distance between the first point and the second point comprises a Cartesian distance.

21. The system of claim 1, wherein the distance between the first point and the second point is at least two standard deviations larger than the mean of the distribution.

22. The system of claim 1, wherein the mean of the distribution represents a standard distance relating the first point to one of the points in the particular space.

* * * * *